(12) United States Patent
Suzaki

(10) Patent No.: US 7,039,215 B2
(45) Date of Patent: May 2, 2006

(54) WATERMARK INFORMATION EMBEDMENT DEVICE AND WATERMARK INFORMATION DETECTION DEVICE

(75) Inventor: Masahiko Suzaki, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 623 days.

(21) Appl. No.: 10/196,377

(22) Filed: Jul. 17, 2002

(65) Prior Publication Data

US 2003/0021442 A1 Jan. 30, 2003

(30) Foreign Application Priority Data

Jul. 18, 2001 (JP) .............................. 2001-217758

(51) Int. Cl.
*G06K 9/00* (2006.01)
*G06K 15/00* (2006.01)
(52) U.S. Cl. ..................................... 382/100; 358/3.28
(58) Field of Classification Search ................ 382/100; 358/3.28
See application file for complete search history.

(56) References Cited

U.S. PATENT DOCUMENTS

| 5,315,098 | A | * | 5/1994 | Tow ............................ 235/494 |
| 5,576,532 | A | * | 11/1996 | Hecht ......................... 235/494 |
| 5,864,742 | A | * | 1/1999 | Gasper et al. ............... 399/366 |
| 5,949,055 | A | * | 9/1999 | Fleet et al. .................. 235/469 |
| 6,600,828 | B1 | * | 7/2003 | Kawamura ................... 382/100 |
| 6,763,121 | B1 | * | 7/2004 | Shaked et al. ............... 382/100 |
| 2001/0028727 | A1 | * | 10/2001 | Naito et al. .................. 382/100 |
| 2001/0030761 | A1 | * | 10/2001 | Ideyama ..................... 358/1.9 |
| 2002/0054356 | A1 | * | 5/2002 | Kurita et al. ............... 358/3.28 |
| 2002/0054680 | A1 | * | 5/2002 | Huang et al. ................ 380/54 |
| 2002/0105679 | A1 | * | 8/2002 | Haynes ...................... 358/3.28 |
| 2002/0114490 | A1 | * | 8/2002 | Taniguchi et al. .......... 382/100 |
| 2002/0180995 | A1 | * | 12/2002 | Yen et al. .................... 358/1.9 |
| 2003/0026450 | A1 | * | 2/2003 | Powell et al. ............... 382/100 |
| 2004/0052401 | A1 | * | 3/2004 | Suzaki ....................... 382/100 |

FOREIGN PATENT DOCUMENTS

| JP | 09-179494 | 7/1997 |
| JP | 10-200743 | 7/1998 |
| JP | 2001-053954 | 2/2001 |
| JP | 2001-078006 | 3/2001 |

* cited by examiner

*Primary Examiner*—Jingge Wu
*Assistant Examiner*—Anthony Mackowey
(74) *Attorney, Agent, or Firm*—Rabin & Berdo, PC

(57) ABSTRACT

There are disclosed a watermark information embedment device capable of accurately embedding secret information, and a watermark information detection device. In the watermark information embedment device, there are prepared a plurality of different sorts of dot patterns in which the wave propagation direction and the wave length are changed depending on the dot arrangement. Each dot pattern of the same sort is given the same symbol, and the secret information is represented by combining these dot patterns. In the watermark information detection device, there are provided 2-dimensional wavelet filters having the same wave propagation direction and the wave length as the different sorts of dot patterns. There is computed convolution between an arbitrary region in the watermarked image and plural 2-dimensional wavelet filters, and it is judged that the dot pattern corresponding to a particular one of the 2-dimensional wavelet filters is embedded in the region where the computed convolution indicates a maximum value.

11 Claims, 21 Drawing Sheets

UNIT E

UNIT A

UNIT B

UNIT PATTERN INDICATIVE OF SYMBOL 0

UNIT PATTERN INDICATIVE OF SYMBOL 1

INPUT IMAGE

AFTER SETTING COORDINATES

② RESTORATION OF DATA CODE

010101..........010101

SECRET INFORMATION

③ DECODING AND FETCHING INFORMATION

UNIT PATTERN FETCHED AS BIT STRING INDICATIVE OF CODE LENGTH

UNIT PATTERN MATRIX

DATA CODE UNIT AS FETCHED

WATERMARK INFORMATION EMBEDMENT DEVICE AND WATERMARK INFORMATION DETECTION DEVICE

BACKGROUND OF THE INVENTION

1. Field of the Invention

The present invention relates to a watermark information embedment device capable of adding secret information to a document image, the secret information being prepared in the form of other than characters, and also relates to a watermark information detection device capable of detecting the secret information from a print document in which the secret information is embedded

2. Description of the Related Art

In order to prevent the original data of an image and a document from being unfairly copied or forged, a digital watermark is used for embedding the information and the secret information in the original data of the image and the document in such a form that is made invisible to anyone except a specially authorized person. In case of the digital watermark, preservation and giving/receiving of the data are all carried out through the electronic medium, so that there hardly occur deterioration and lost of the information as embedded in the form of the digital watermark, thus enabling the information detection to be surely and accurately executed with ease. Similar to the case of the digital watermark for protecting the digital image and document, it is needed for an original image and a document printed on a paper medium, so-called a printed matter, to be prevented from unfair actions such as copying with ill intent, alteration, misappropriation, forgery, and so forth, by a certain means capable of embedding the secret information in the form of other than characters that are made invisible to anyone other than a specially authorized person.

With regard to a prior art method for embedding a watermark in a white-black binary document which is most widely utilized as a printed matter, there have been made the considerable number of prior art disclosures so far. Therefore, some of them will be described for reference in the following.

(1) Japanese Patent Publication No. 2001-78006 entitled "Method for Embedding and Detecting Watermark Information in White-Black Binary Document Image and Device Using The Same."

A minimum rectangle surrounding an arbitrary character string is divided into a certain number of blocks, which are further divided into two groups, group 1 and group 2 for instance (the number of groups may be 3 or more). When a signal is "1", the characteristic quantity in each block of the group 1 is increased and the characteristic quantity in each block of the group 2 is decreased. When a signal is "0", reverse operation is carried out. In this case, the characteristic quantity in the block indicates the number of pixels and the thickness of characters in the character region, a distance needed for a scanner to run before meeting with the first character region while it vertically scans the block, and so forth.

(2) Japanese Patent Publication No. 2001-53954 entitled "Information Embedment Device, Information Readout Device, Digital Watermark System, Information Embedment Method, Information Readout Method and Storage Medium."

In this disclosure, the width and height of a minimum rectangle surrounding one character is defined as a characteristic quantity and a symbol is indicated by a classification pattern classified based on the size (large/small relation) of the characteristic quantity between two or more characters. For instance, six characteristic quantities can be defined from three characters and possible combination patterns are enumerated based on the size (large/small relation) of the characteristic quantities. These combination patterns are further divided into two groups, of which each is given a symbol. If the information to be embedded is "0" and the character quantity of a character selected to indicate this information is "1," any one of six characteristic quantities is changed by expanding the character region or so. The pattern to be changed is selected such that the quantity of the change becomes minimum.

(3) Japanese Patent Publication No. 9-179494 entitled "Method for Recording Secret Information."

In this disclosure, it is presumed that images and documents are printed by means of a printer of the 400 dpi type. The information is converted into a numerical form and is expressed by a distance (the number of dots) between a reference mark and a position distinguishing mark.

(4) Japanese Patent Publication No. 10-200743 entitled "Document Processing Device."

In this disclosure, the information is expressed by judging whether or not screen lines of a million line screen (a special screen made up of a lot of thin parallel lines) are moved backward.

According to the above prior art disclosures (1) and (2), however, the pixels constituting the characters of the document image, interval between characters and interval of lines will have to be changed, so that it becomes necessary to change fonts and layouts. In addition, according to the above prior art disclosures (3) and (4), when detecting the information, it is necessary to carry out such a high accuracy detection that the information embedded in the input image as read out by such a device as a scanner is detected with very high accuracy of one pixel unit. In spite of the demand for such high accuracy detection, if very fine contaminants are mixed in a printing paper, or if certain noises are introduced while the document image is printed or read out, the accuracy of the information detection would come to receive a large influence.

As described above, according to the above prior art disclosure (1) through (4), even if trying to detect the secret information embedded in a printed document image by first inputting the document image to the input device like a scanner and further inputting the result of scanning to a computer, so many noise components would be involved in the data of the document image inputted to the computer, because of stains left on the printed document image, deformation of the image due to rotation of the image possibly occurring when first setting the printed document image to the input device. Therefore, it becomes so hard to fetch the secret information with accuracy, even though making use of the above prior arts techniques as described above.

SUMMARY OF THE INVENTION

The invention has been made in view of the above problems still existing in the prior art watermark information embedment/detection techniques. Accordingly, an object of the invention is to provide a novel and improved watermark information embedment device and watermark information detection device as well.

In order to solve such problems as mentioned above, according to the invention, there is provide a watermark information embedment device, which includes a document image formation portion forming a document image based on the document data on the page by page basis; a watermark image formation portion forming a watermark image; and a watermarked document image composition portion forming a watermarked document image by putting the document image on the watermark image.

The watermark image is made up of plural sorts of dot patterns which are well-regularly arranged according to a certain rule, and at least one sort of the dot pattern is provided with secret information indicative of a specific confidential matter. Furthermore, in order to solve such problems as mentioned above, according to the invention, there is provide a watermark information detection device, which includes a watermark detection portion for detecting a watermark image from a watermarked document image formed by putting a document image on a watermark image in which plural sorts of dot patterns are embedded.

The watermark detection portion is provided with a filter for extracting the same plural sorts of dot patterns as the watermark image, and the watermark image is extracted by examining the matching between the filter and the watermarked document image.

BRIEF DESCRIPTION OF THE DRAWINGS

The watermark information embedment device and the watermark information detection device according to the invention will now be described in detail by way of exemplary embodiments of the invention and with reference to the accompanying drawings. In this specification as well as in each of several figures of the accompanying drawings, the constituents of the invention having substantially like function and constitution are designated by the like reference numeral and character for avoiding redundant repetitive description thereabout. In the drawings.

DETAILED DESCRIPTION OF THE PREFERRED EMBODIMENT

As described above, FIG. 1 is a block diagram for explaining the constitution of the watermark information embedment device and the watermark information detection device according the embodiment of the invention as well.

(Watermark Information Embedment Device 10)

Figure 1:
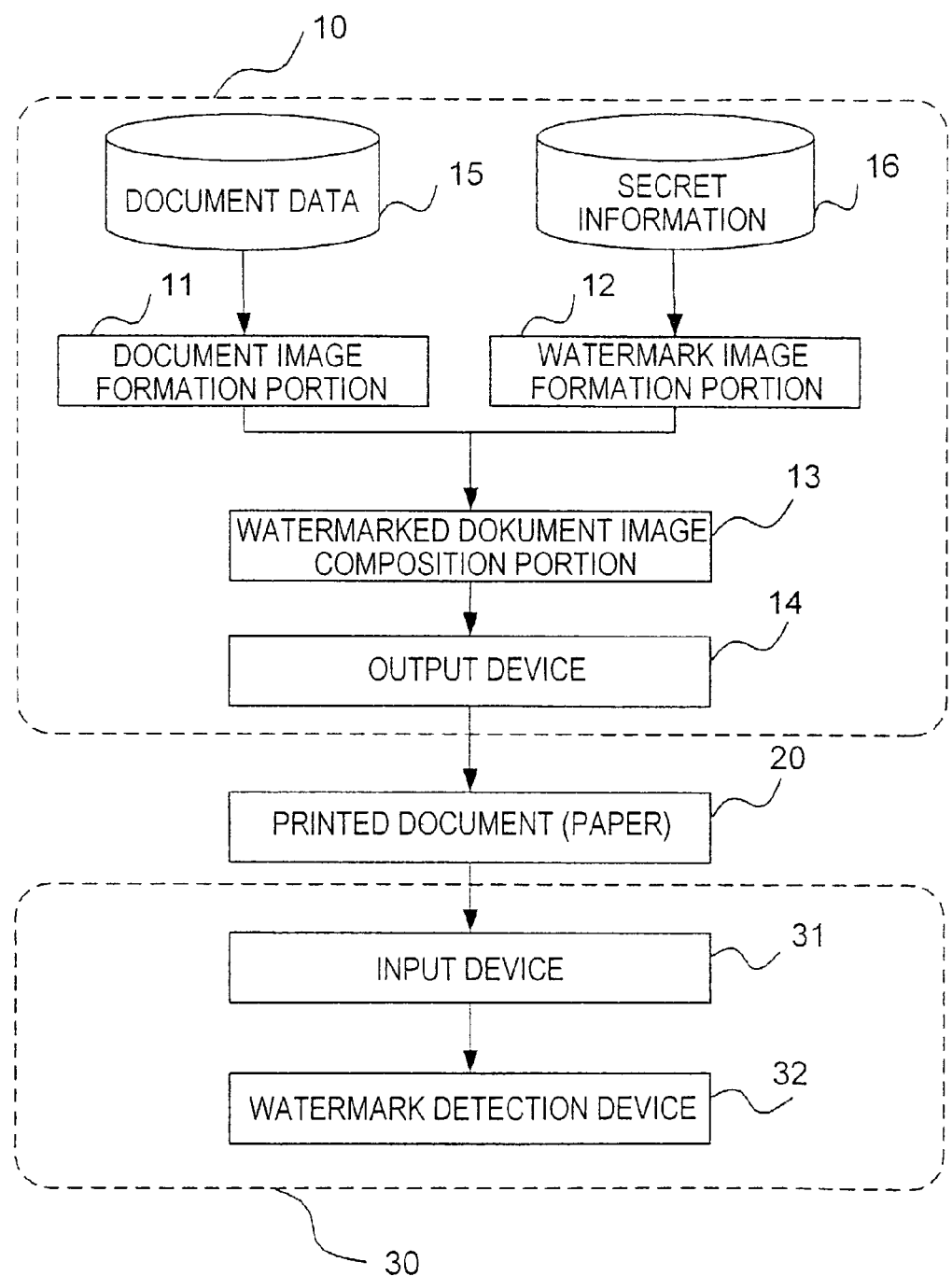
FIG. 1 is a block diagram for explaining the constitution of the watermark information embedment device and the watermark information detection device as well.

A watermark information embedment device 10 is a device capable of forming a document image based on a document data and secret information to be embedded in the document and printing the document image on the paper medium. As shown in FIG. 1, the watermark information embedment device 10 includes a document image formation portion 11, a watermark image formation portion 12, a watermarked document image composition portion 13, and an output device 14. A document data is a data formed by means of a document formation tool or the like. Secret information 16 is the information to be embedded in the paper medium in the form of other than characters, that is, in the form of character strings, images, voice data, and so forth.

The document image formation portion 11 forms an image appearing on the printing paper when it is printed thereon. To put it more concretely, a white pixel region in the document image is a portion in which nothing is printed while a black pixel region is a portion which is painted with black painting material. The present embodiment will be described on the premise that printing is carried out with white printing paper and black ink (mono-colored printing). However, the invention is not limited to this embodiment but applicable to the case where printing is carried out with various colored painting materials.

The watermark image formation portion 12 has the function of digitizing the secret information 16 to convert it into numeric information, further coding the above converted information by means of an N-dimensional coding (N≧2), and still further assigning each symbol of the coding language to signals as prepared in advance. The signals express a wave (change in light and shade of color) having an arbitrary propagation direction and an arbitrary wave length by means of the dot arrangement in a rectangular region with an arbitrary size, and the symbol is assigned to the wave propagation direction and the wave length. The watermark image is that which is formed by arranging these signals on the image according to a certain rule.

A watermarked document image composition portion 13 forms a watermarked document image by putting the document on the watermark image. The output device 14 may be formed by such a device as a printer capable of printing the watermarked document image on the paper medium. Accordingly, the document image formation portion 11, the watermark formation portion 12, and the watermarked document image composition portion 13 may be realized as one of the functions of a printer driver.

A printed document 20 is formed by embedding secret information 16 in an original document data 15 and printing it. The printed document is physically stored and administrated.

(Watermark Information Detection Device 30)

A watermark information detection device 30 fetches the document printed on the paper medium as an image and restores the secret information embedded therein. As shown in FIG. 1, the watermark information detection device 30 is made up of an input device 31 and a watermark detection portion 32.

The input device 31 is such a device as a scanner and fetches the document 20 into the computer, the document 20 being as printed on the printing paper as a gray image of multi-valued intensity levels. The watermark detection portion 32 filters an input image, thereby detecting the embedded signal. Furthermore, the watermark detection portion 32 restores the symbol based on the detected signal and takes out the secret information.

In the next, there will be described respective operations of the watermark information embedment device 10 and the watermark information detection device 30 as constituted above. To begin with, the operation of the watermark information embedment device 10 will be described with reference to FIGS. 1 through 11.

(Document Image Formation Portion 11)

The document data 15 include the font information, the layout information, and so forth, and is formed by means of the word processing software and the like. The document image formation portion 11 forms the image appearing on the printing paper when the document is printed on the page by page basis by making use of the document data 15. This document image is a white and black binary image and white pixels (value=1) on the image correspond to a background while black pixels (value=0) correspond to a character region (painted with ink).

(Watermark Image Formation Portion 12)

The secret information 16 includes various data, for instance character, voice, image, and so forth. The watermark image formation portion 12 forms a watermark image by using such information. The watermark image is then put on the document image as the background thereof.

Figure 2:
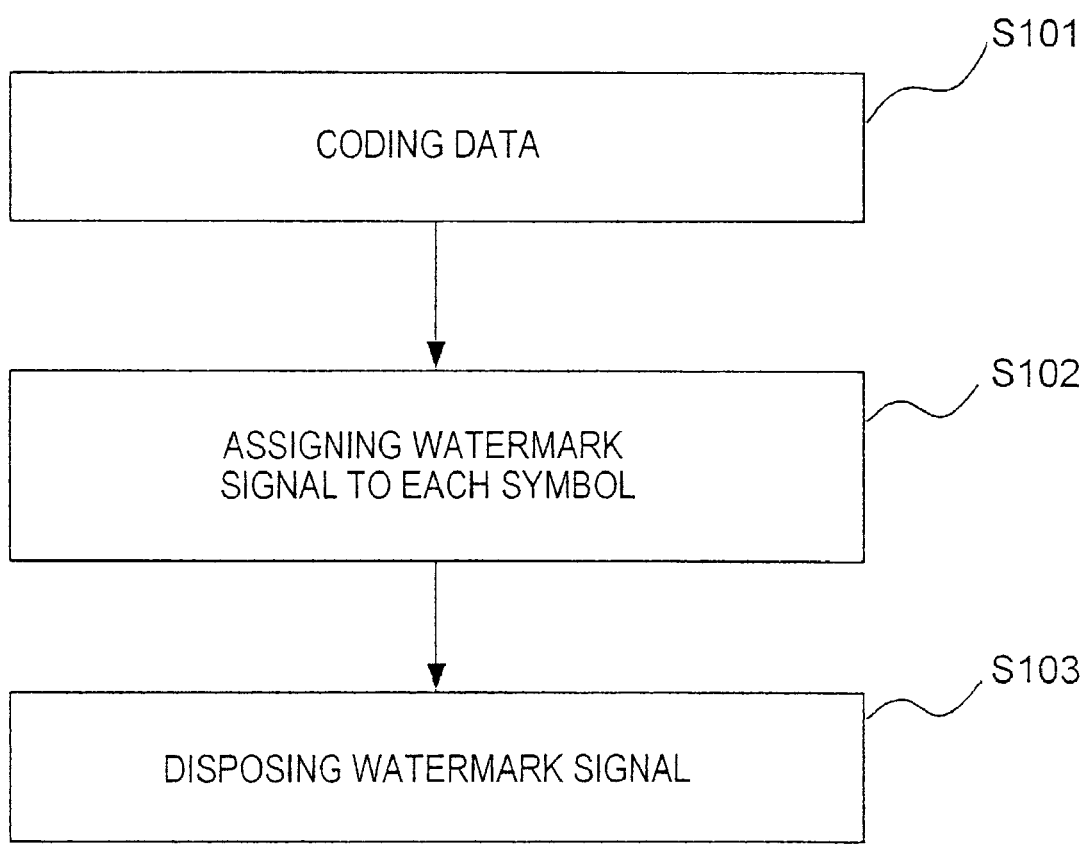
FIG. 2 is a flow chart describing the flow of the processing by the watermark image formation portion.

FIG. 2 is a flow chart describing the flow of the processing by the watermark image formation portion 12.

First of all, the secret information 16 is converted into N-dimensional codes (step S101). "N" may be an arbitrary integer of 2 or more than 2, but in the explanation of this embodiment, "N" is set to be N=2 for making the explanation simple and easy. Accordingly, the codes generated in the step S101 are binary codes expressed by a bit string made up of "0" and "1." In this step S101, the data may be coded as they are or coded after encrypting them once.

In the next, a watermark signal is assigned to each symbol of the coding language (step S102). The watermark signal is a signal as used for expressing a wave of which the length and propagation direction can be arbitrarily changed by the way of arranging dots (black pixels). The watermark signal will be further described later.

Furthermore, a signal unit corresponding to the bit string of the coded data is arranged on the watermark image (step S103).

Figure 3:
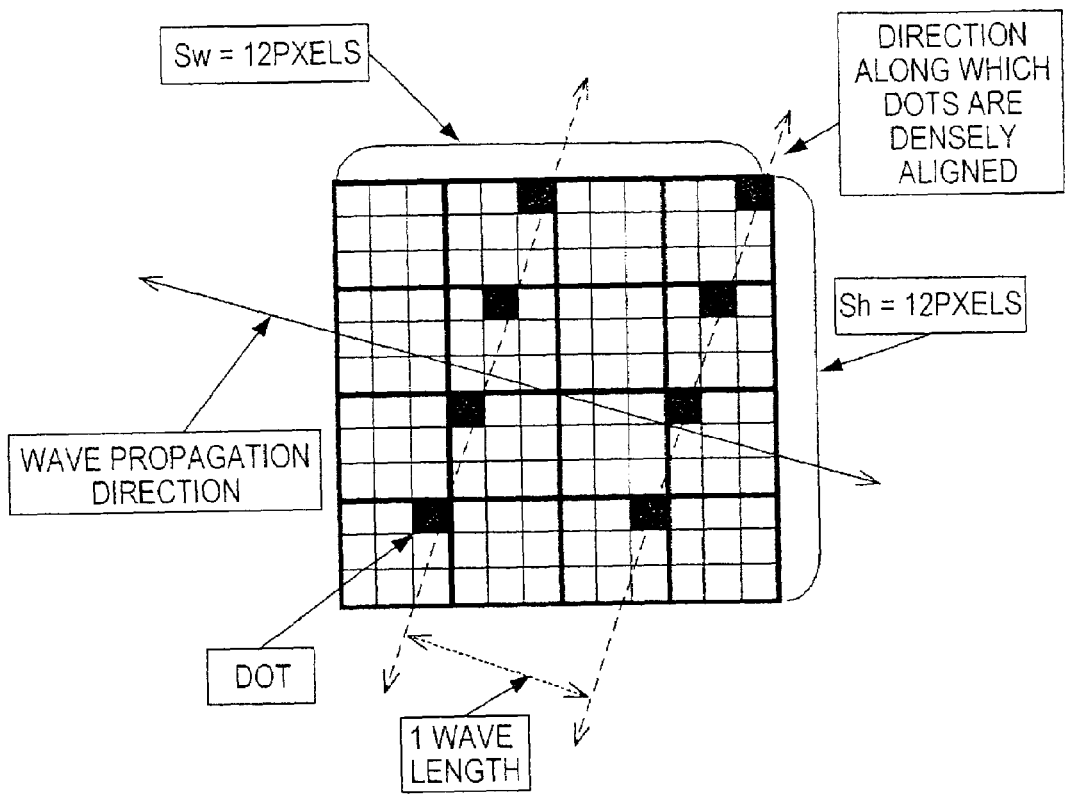
FIG. 3 is a diagram showing an example of a watermark signal, in which (1) indicates a unit A and (2) indicates a unit B.
Figure 3:
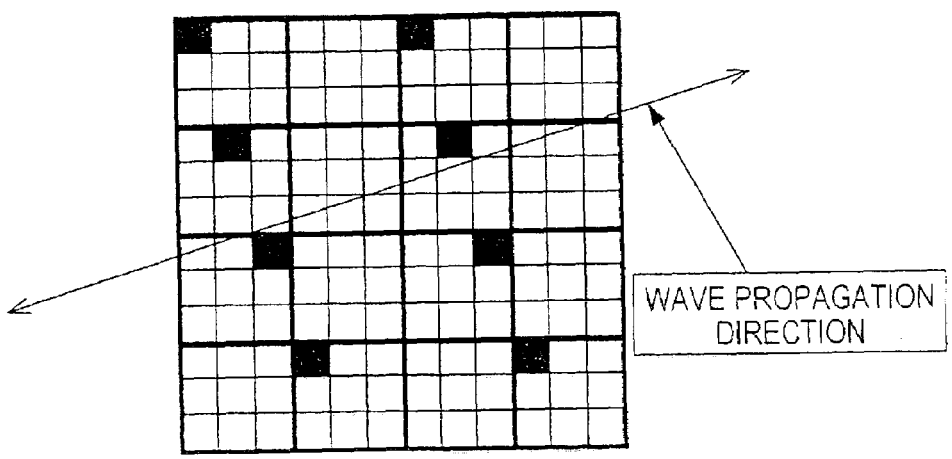

The watermark signal assigned to each symbol of the coding language in the step S102 will be explained with reference to FIG. 3 showing an example of a watermark signal.

Now, let the width and height of the watermark signal be Sw and Sh. Sw and Sh may be different from each other, but in the explanation of the present embodiment, both of Sw and Sh are set to be equal to each other for making the explanation simple and easy. In this embodiment, a length is measured by using the number of pixels, so that in the example as shown in FIG. 3, the width and the height of the watermark signal become Sw=Sh=12. When these signals are printed on the printing paper, the size of the printed area depends on the resolution of the watermark image. For instance, if the watermark image is an image of 600 dpi (dots per inch: unit of resolution, the number of dots per inch), the width and the height of the watermark signal as shown in FIG. 3 become equally 12/600=0.02 inches on the printed document.

A rectangle of Sw×Sh is called "signal unit" as a unit of a signal hereinafter in this specification. In FIG. 3 (1), the distance between dots is set such that dots are densely arranged in the direction of arctan(3) with regard to the horizontal axis while the wave propagates in the direction of arctan(−⅓). This signal unit A is called a "unit A" hereinafter. In FIG. 3 (2), the distance between dots is set such that dots are densely arranged in the direction of arctan(−3) with regard to the horizontal axis while the wave propagates in the direction of arctan(⅓). This signal unit B is called a "unit B" hereinafter.

Figure 4:
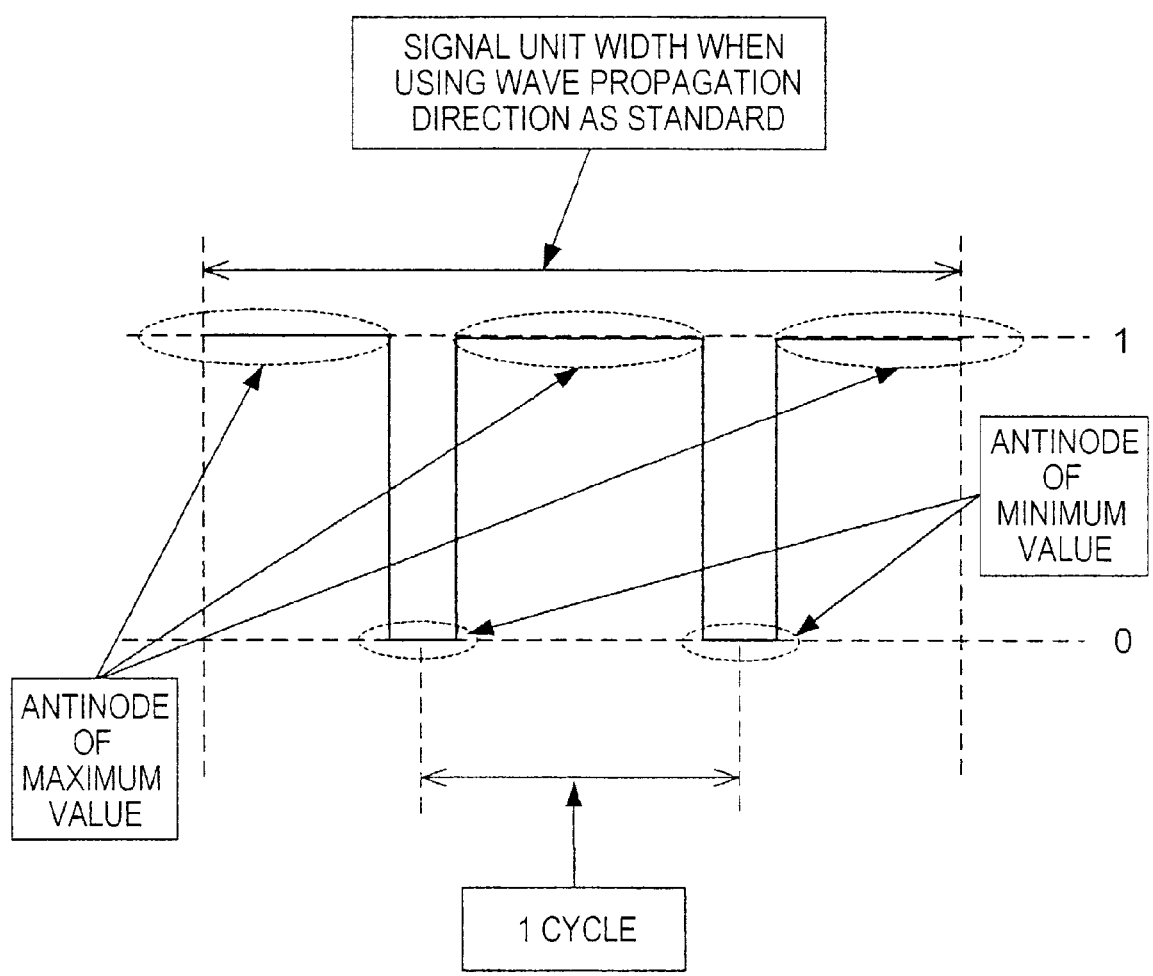
FIG. 4 is a cross sectional view obtained when seeing the change of the pixel value of FIG. 3 (1) in the direction of arctan(⅓)

FIG. 4 is a sectional view obtained when seeing the change of the pixel value of FIG. 3 (1) in the direction of arctan(−⅓). In FIG. 4, the portion in which dots are arranged corresponds to the antinode of minimum value while the portion in which no dot is arranged corresponds to the antinode of maximum value.

In each unit, there exist two regions in which dots are densely arranged respectively, so that the two frequencies exist per unit in this example. The wave propagation direction is perpendicular to the direction along which dots are densely arranged, so that the direction along which the dots are densely arranged becomes arctan(−⅓) with respect to the horizontal direction in the wave of the unit A while it becomes arctan (⅓) in the unit B. In general, when the direction of arctan(a) and the direction arctan(b) are perpendicular to each other, a relation of a×b=−1 is satisfied In the present embodiment, the symbol "0" is assigned to the watermark signal expressed by the unit A while the symbol "1" is assigned to the watermark signal expressed by the unit B. These symbols are called a symbol unit.

Figure 5:
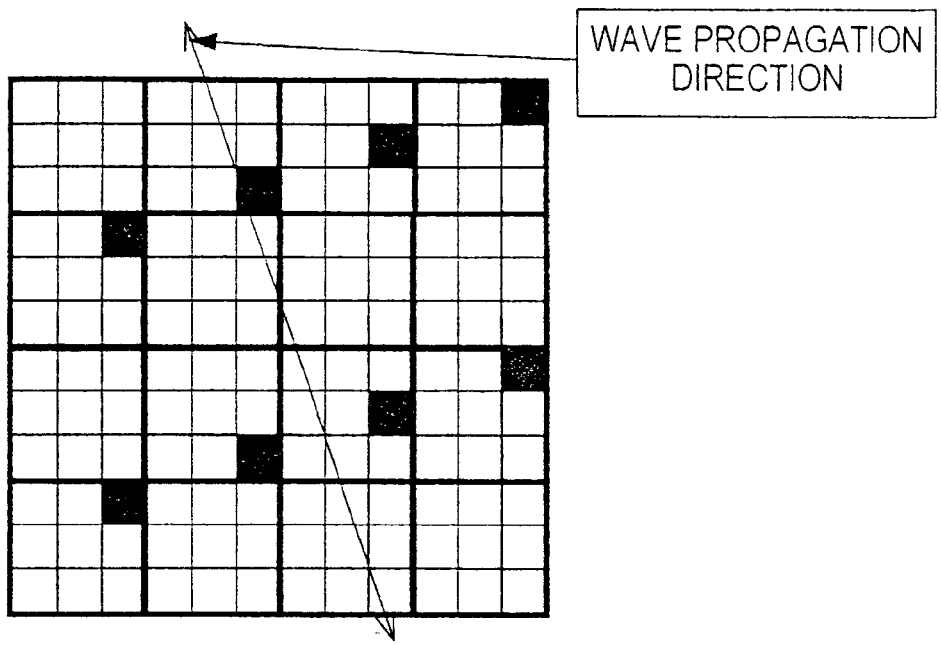
FIG. 5 is illustrations showing an example of a watermark signal, in which (3) indicates a unit C, (4) indicates a unit D, and (5) indicates a unit E.
Figure 5:
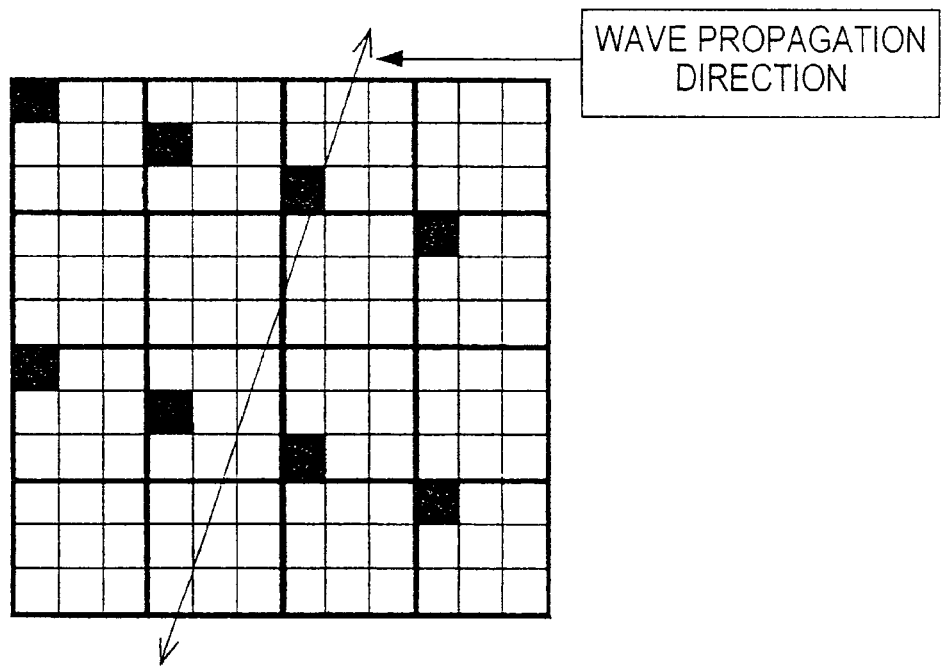
Figure 5:
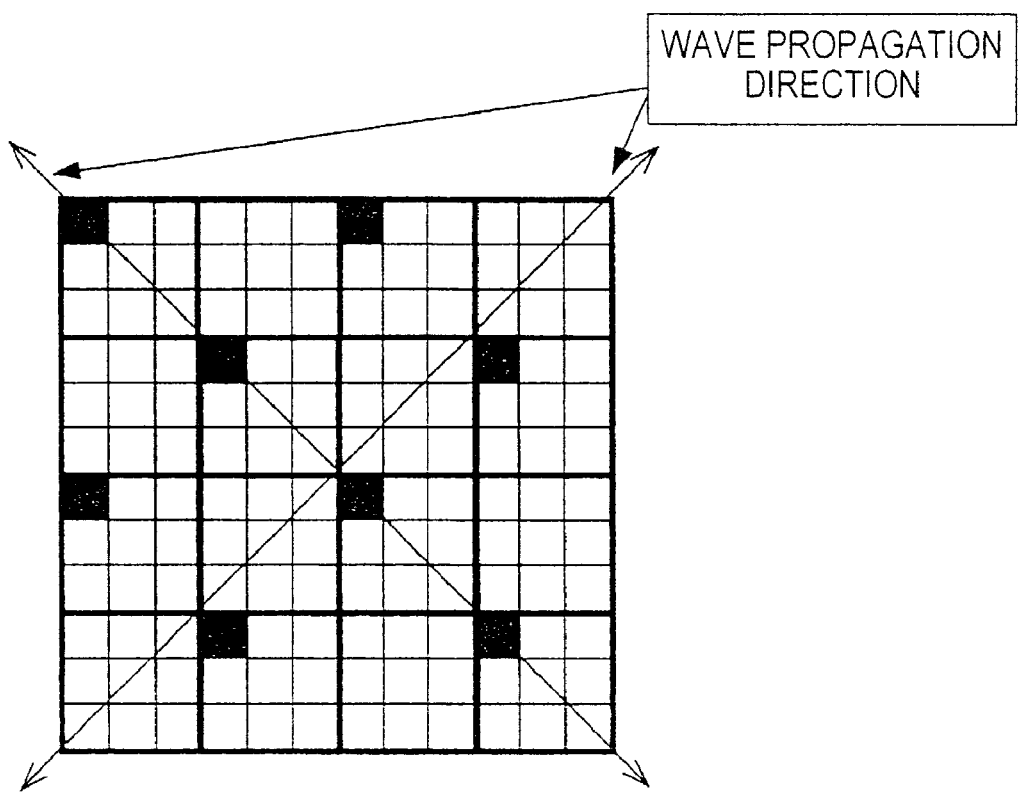

Besides the watermark signals as shown in FIG. 3 (1) and (2), it is possible to consider other watermark signals realized by using other dot arrangements as shown in FIG. 5 (3) through FIG. 5 (5). FIG. 5 (3) shows a dot arrangement in which the distance between dots is set such that dots are densely arranged in the direction of arctan(⅓) with respect to the horizontal axis while the wave propagates in the direction of arctan(−3). This signal unit will be referred to as a "unit C" hereinafter. FIG. 5 (4) shows another dot arrangement in which the distance between dots is set such that dots are densely arranged in the direction of arctan(−⅓) with respect to the horizontal axis while the wave propagates in the direction of arctan(3). This signal unit will be referred to as a "unit D" hereinafter. FIG. 5 (5) shows still another dot arrangement in which the distance between dots is set such that dots are densely arranged in the direction of arctan(1) with respect to the horizontal axis while the wave propagates in the direction of arctan(−1). The dot arrangement as shown in FIG. 5 (5) may be considered as follows. That is, the distance between dots is set such that dots are densely arranged in the direction of arctan(−1) with respect to the horizontal axis while the wave propagates in the direction of arctan(1). This signal unit will be referred to as a "unit E" hereinafter.

In this way, besides the unit combinations to which the symbol has been assigned previously, there can be considered a plurality of other combination patterns to which symbols "0" and "1" can be assigned. Accordingly, if it is kept secret which symbol is assigned to which watermark from third parties (unfair appropriators, for instance), they would not be able to break it with ease.

Furthermore, if coding the secret information by means of the 4-dimensional coding language in the step S102 of FIG. 2, the symbols "0" through "3" of the coding language can be assigned to the units A, B, C and D, respectively.

In examples of the watermark signal as shown in FIGS. 3 and 5, the number of dots in one unit is made equal to each other, so that if these units are closely arranged without leaving any space therebetween, the light and shade of the watermark image would be made seemingly uniform to the eye. Consequently, on the printed paper, it seems as if a gray image with a single color thickness is embedded as a background.

In order to obtain the effects like this, firstly define the unit E as a background unit (a signal unit as is given any symbol) and then, closely arrange a plurality of background units without leaving any space therebetween, thereby forming the background of a watermark image. In case of embedding the symbol units (unit A, unit B) in the watermark image, the background unit (unit E) at the site for embedding the watermark is replaced by the symbol units (unit A, unit B).

Figure 6:
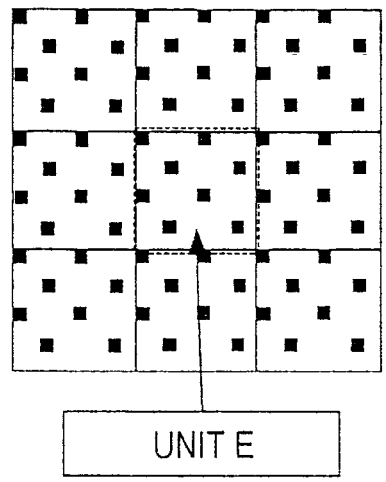
FIG. 6 is illustrations for explaining a background image, in which (1) indicates that each unit E is defined as a background unit and a plurality of them are closely arranged without leaving any space therebetween, thereby forming the background of a watermark image, (2) indicates an example wherein the unit A is embedded in the background image as formed in the above (1), and (3) indicates an example wherein the unit B is embedded in the background image as formed in the above (1), FIG. 7 indicates an example of a method for embedding a symbol in a watermark image, FIG. 8 indicates a flow chart with regard to a method for embedding secret information in a watermark image, FIG. 9 indicates illustrations for showing the flow of the processing of a watermark detection portion 32, FIG. 10 indicates illustrations for explaining an example of a watermarked document image.
Figure 6:
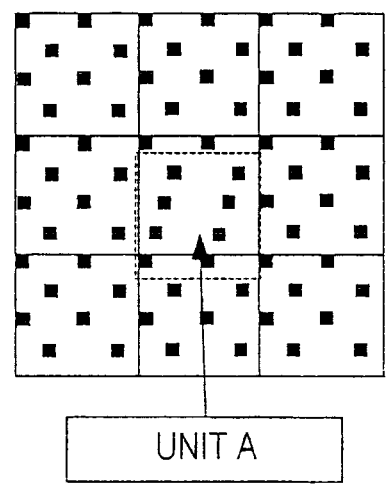
Figure 6:
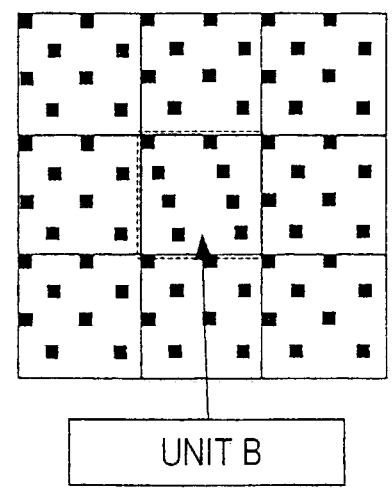

FIG. 6 is illustrations for explaining a background image, in which FIG. 6 (1) indicates that the unit E is defined as a background unit and a plurality of them are closely arranged without leaving any space therebetween, thereby forming the background of a watermark image, FIG. 6 (2) indicates an example wherein the unit A is embedded in the background image as formed in the above FIG. 6 (1), and FIG. 6 (3) indicates an example wherein the unit B is embedded in the background image as formed in FIG. 6 (1). In this embodiment, there is explained a method for forming the background of the watermark image by using a plurality of background units, but it is possible to form the watermark image by arranging only a plurality of symbol units.

In the next, a method for embedding one symbol of the coding language in the watermark image will be explained with reference to FIG. 7.

Figure 7:
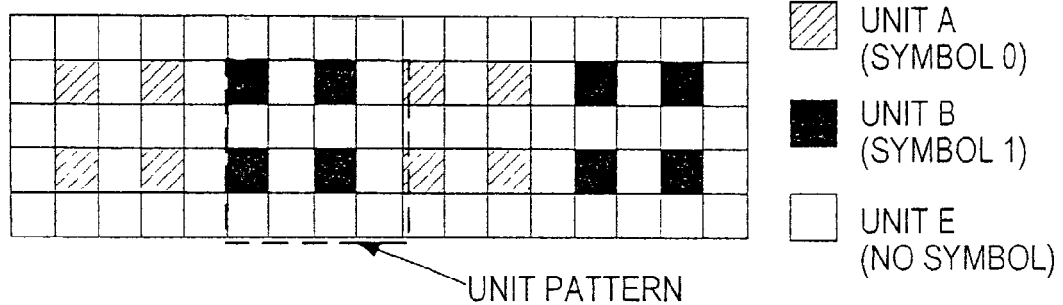
Figure 7:
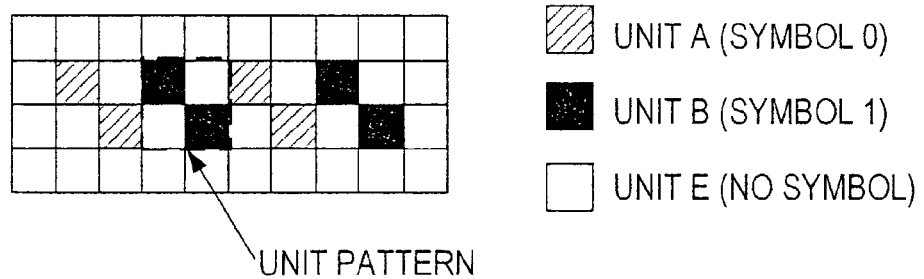
Figure 7:
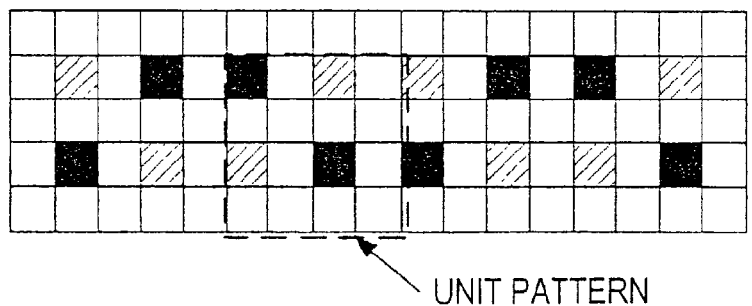
Figure 7:
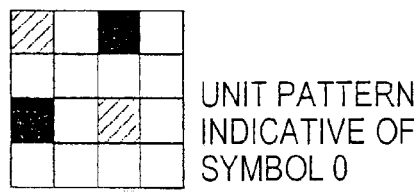
Figure 7:
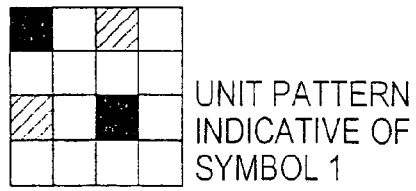

FIG. 7 indicates an example of a method for embedding one symbol in a watermark image. Explanation will be made here about an instance where a bit string of "01017" is embedded in the watermark image.

As shown in FIGS. 7 (1) and FIG. 7 (2), the same symbol units are repetitively embedded. This is for preventing the signal detection from being stopped when the character in the document and the embedded symbol unit overlaps each other. The repetitive pattern and arrangement pattern of the symbol unit (referred to as "unit pattern" hereinafter) may be set in the arbitrary manner.

That is, as will be seen from examples shown in FIG. 7, if setting the repetitive number of times to be 4, four symbol units come to exist in one unit pattern as shown FIG. 7 (1), and if setting it to be 2, two symbol units come to exist in one unit pattern shown in FIG. 7 (2), or it may be also possible to have one symbol unit existed in one unit pattern by setting repetitive number of times to be 1.

In the examples as shown in FIG. 7 (1) and (2), one symbol is given to one symbol unit, but it is possible to give a symbol to an arrangement pattern of the symbol unit as shown in FIG. 7 (3).

How much information quantity can be embedded in the watermark image per page depends on each size of the signal unit, the unit pattern and the document image. It is possible to carry out the signal detection by treating the number of signals embedded in the horizontal and vertical directions of the document image as an already-known number, or after definitely determining the number of these signals by reversely calculating it from respective sizes of the image as inputted from the input device and the signal unit as well.

Assuming that units of Pw (integer) and units of Ph (integer) are embedded in the watermark image per page respectively along the horizontal and vertical directions thereof, let a unit pattern in an arbitrary position of the image be U(x, y) where x:1 through Pw and y:1 through Ph, and let us call U(x, y) a "unit pattern matrix" hereinafter. Also, let us call the number of bits allowed to be embedded per page "embedded bit number," which is Pw×Ph.

Figure 8:
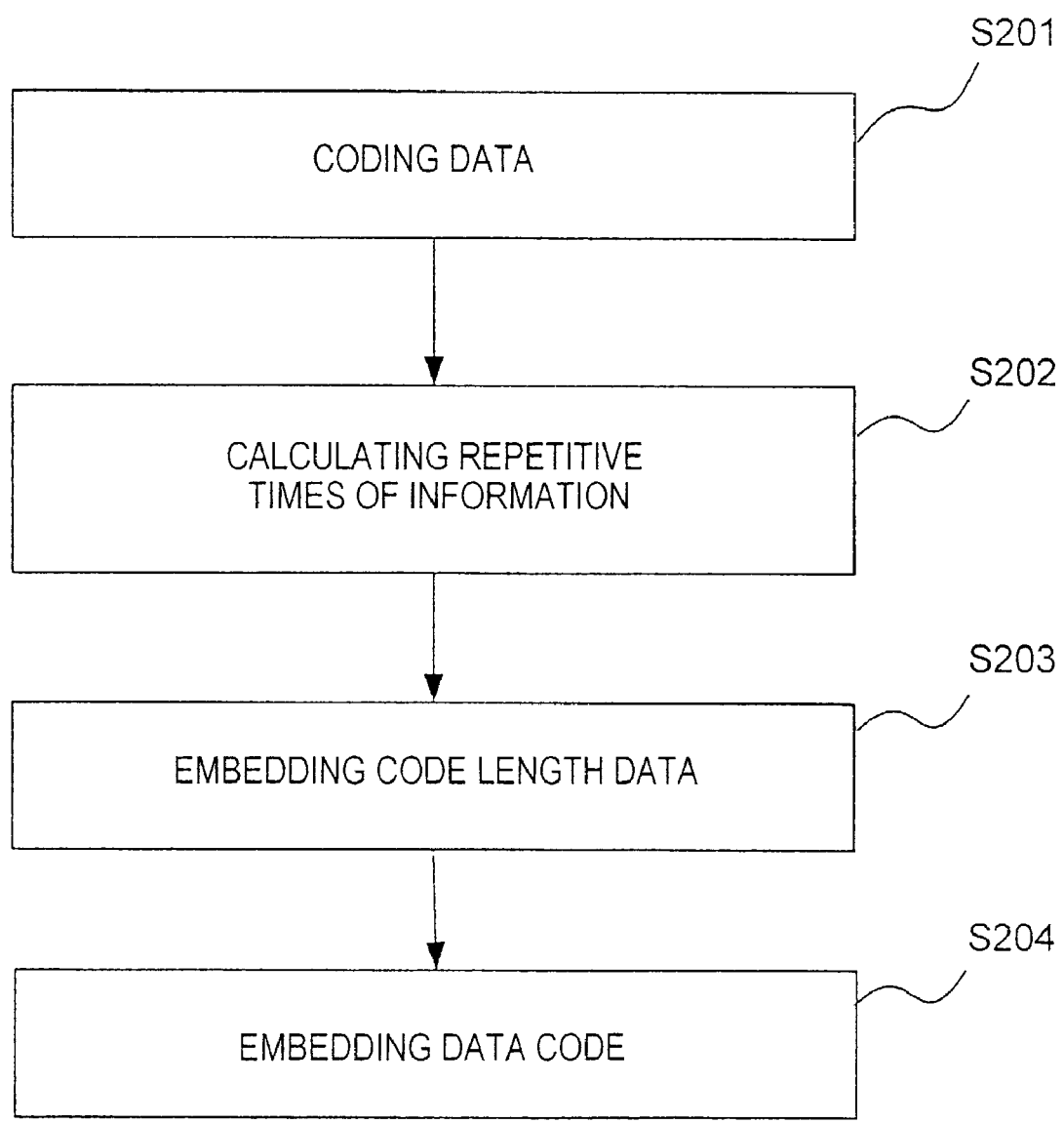

FIG. 8 indicates a flow chart with regard to a method for embedding secret information in a watermark image.

Here, explanation will be made about an instance where the same information is repeatedly embedded in the watermark image for one page. It sometimes happens that when putting the document image on the watermark image, one unit pattern is entirely covered with a paint, thereby the embedded information being lost and the detection of the embedded information being made impossible. However, this repetitive embedment of the same information makes it possible to detect the embedded information even under such situation.

First of all, the secret information is converted into N-dimensional code (step S201). This is the same step as the step S101 in FIG. 2. In the following, the coded data is called "data code" while the data code expressed by combination of unit pattern is called "data code unit Du."

In the next, how many times the data code unit can be repetitively embedded in the image for one page is calculated based on the code length (the number of bits in this case) of the data code and the number of bits as embedded as well (step S202). In this embodiment, the code length data of the data code is inserted in the first row of the unit pattern matrix. It may be allowed to fix the code length of the data code to a certain value, thereby the code length data being unable to be embedded in the watermark image.

The embedment number of times Du of the data code unit is calculated by the following formula where Cn indicates the data code length.

$$Dn = \left\lfloor \frac{Pw \times (Ph-1)}{Cn} \right\rfloor$$

[A]: a maximum integer not exceeding A

Figure 9:
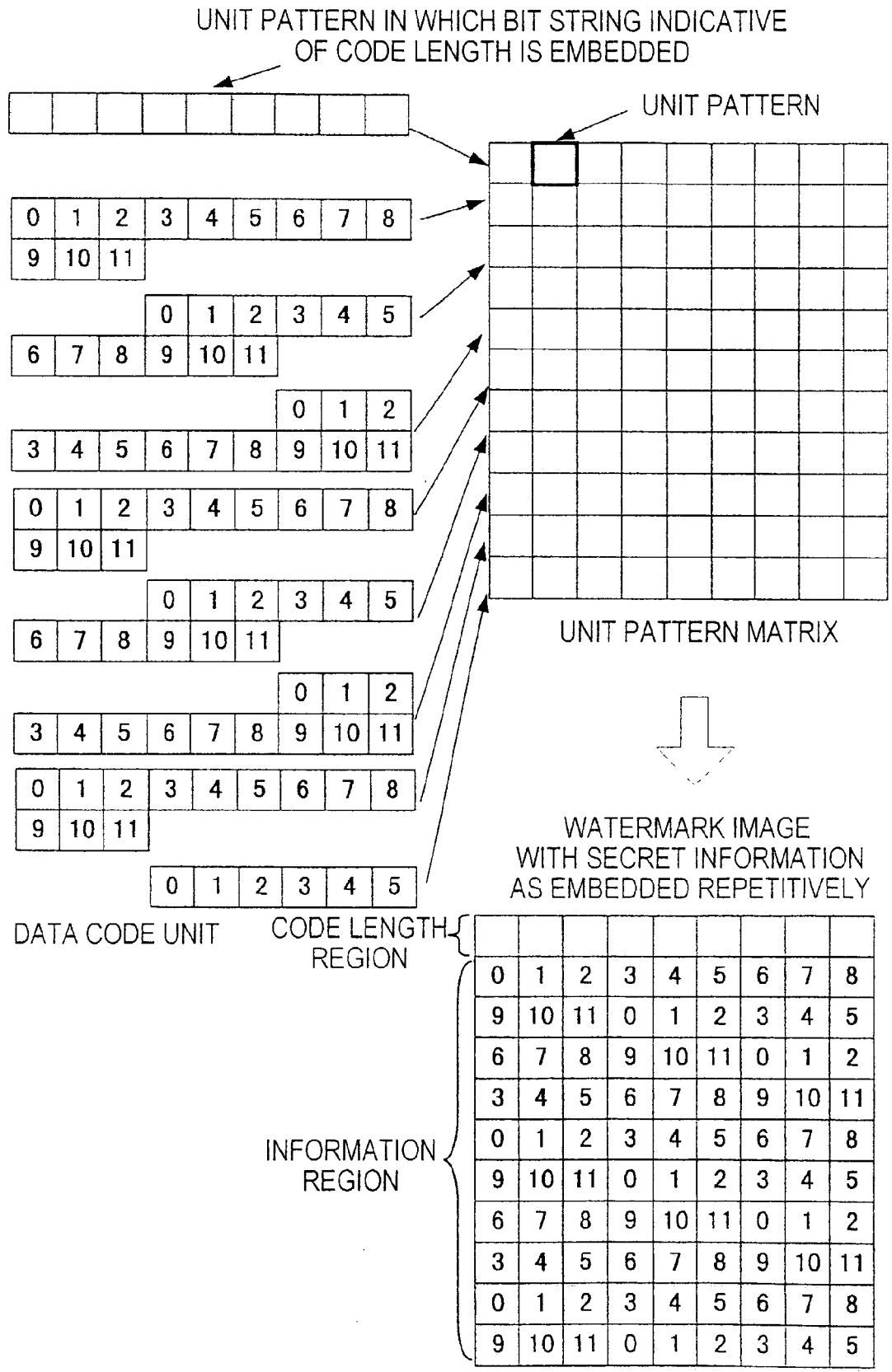

Now, if a surplus Rn is expressed as Rn=Cn−(Pw×(Ph−1), the data code unit and the unit pattern corresponding to the leading Rn bits of the data code come to be embedded in the unit pattern matrix by Dn times. However, It is not always necessary for Rn bits of the surplus portion to be embedded An example of the unit pattern matrix as shown in FIG. 9 has a size of 11×9 (11 rows and 9 columns) and the data code length is 12 bits. In this figure, the numbers 0 through 11 indicate the coding language given to data codes, respectively.

In the next, the code length data is embedded in the first row of the unit pattern matrix (step S203). In respect of the example shown in FIG. 9, it is explained that the code length is expressed by the data of 9 bits and the embedment is carried out only one time. However, if the width Pw of the unit pattern matrix is wide enough, the code length data may be repeatedly embedded in the same manner as the data codes.

Furthermore, data code unit is repeatedly embedded in the second row and thereafter of the unit pattern matrix (step S204). As shown in FIG. 9, embedment is carried out by sending out in sequence the data code string starting from the most significant bit (MSB) or starting from the least significant bit (LSB) in the direction of the row of the unit pattern matrix. In the example shown in FIG. 9, the data code unit is embedded 7 times and the leading 6 bits are also embedded.

A method for embedding the data is carried out, as shown in FIG. 9, such that the embedded data codes are continuously arranged side by side in the row direction without leaving any space therebetween. The direction of sending out the data code in sequence may be the column direction of the unit pattern matrix.

So far, there has been explained the watermark image in the watermark formation portion 12. In the next, there will be described the watermarked document image composition portion 13 of the watermark information embedment device 10.

(Watermarked Document Image Composition Portion 13)

In the watermarked document image composition portion 13, there are put on each other a document image formed in the document image formation portion 11 and a watermark image formed in the watermark image formation portion 12. The value of each pixel in the watermarked document image is calculated by AND operation of pixel value at the time when the document image and the watermark image correspond to each other. To put it more concretely, if either the document image or the watermark image has a pixel value of 0 (black), the pixel value of the watermarked document image comes to have the pixel value of 0 (black). The case other than this comes to have a pixel value of 1 (white).

Figure 10:
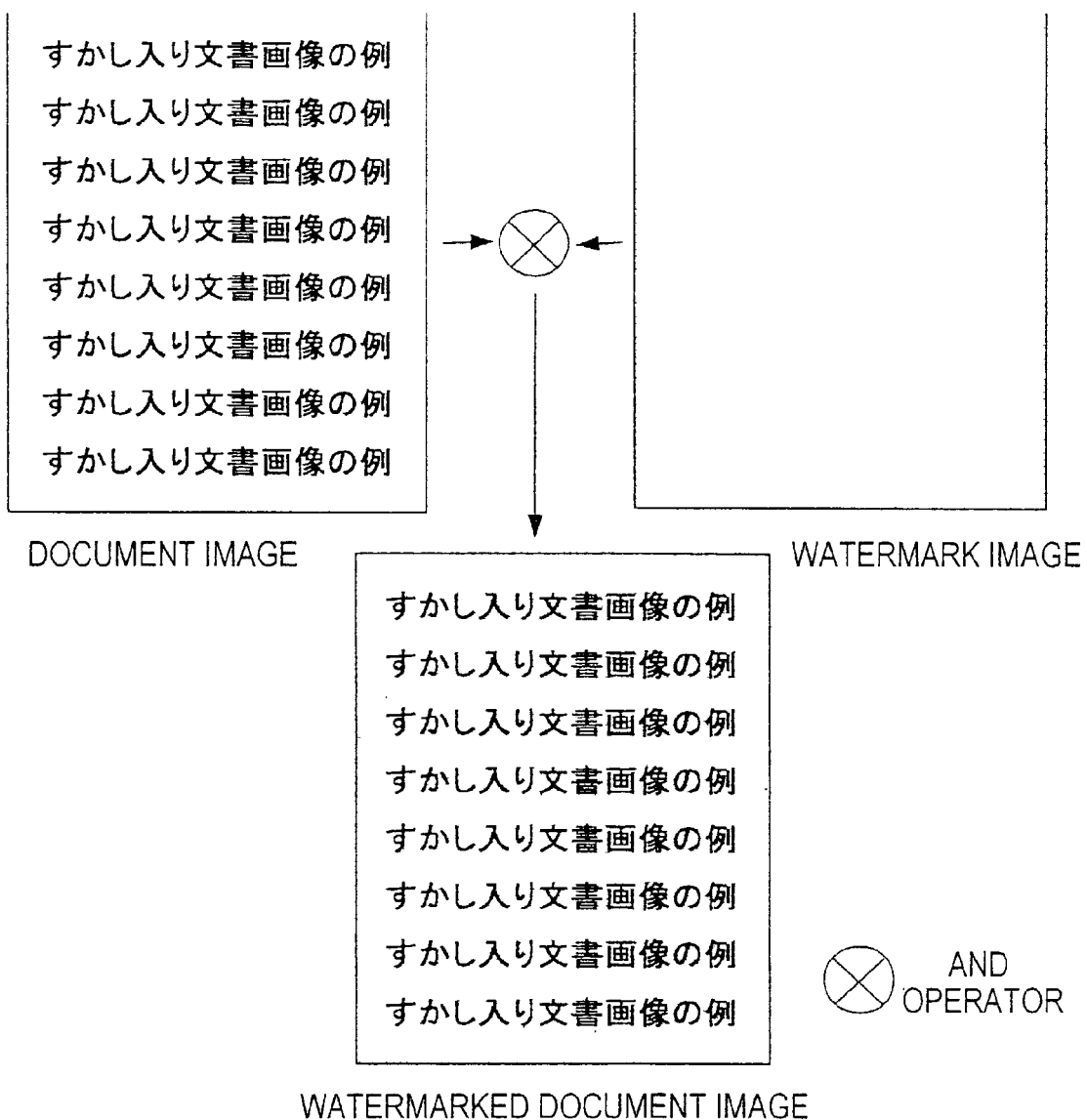
Figure 11:
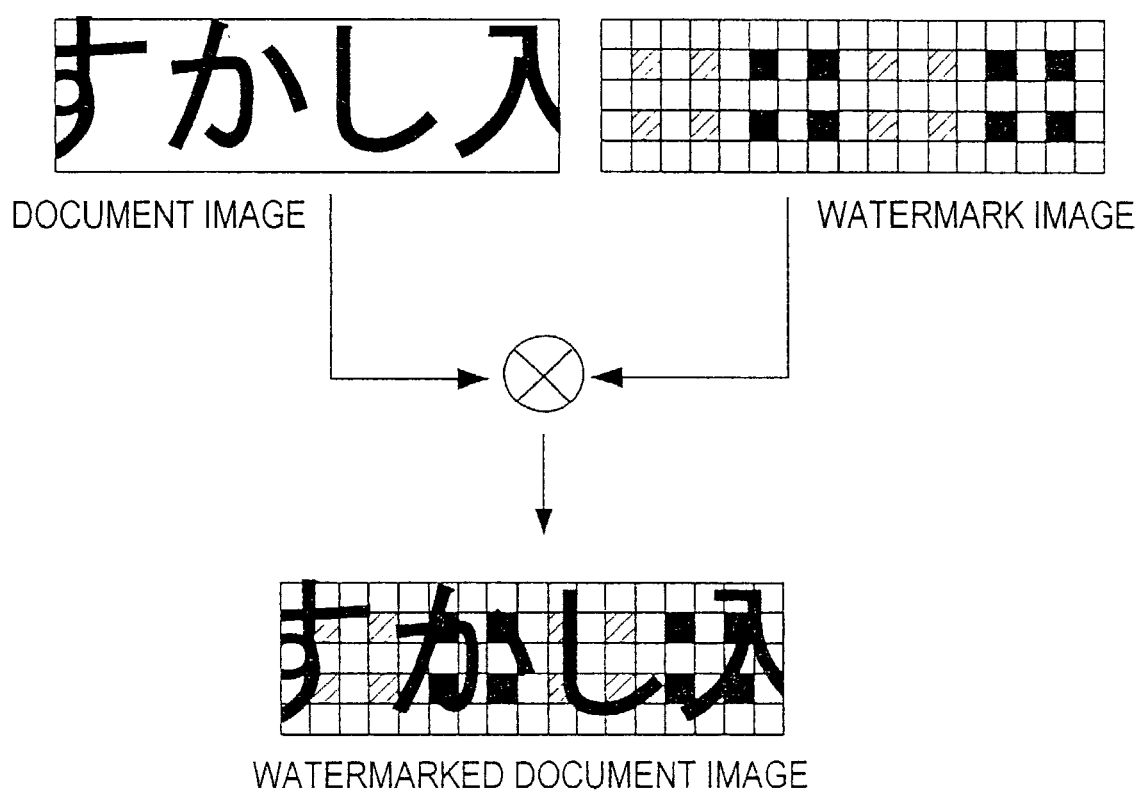
FIG. 11 is an enlarged view enlarging in part FIG. 10.

FIG. 10 indicates illustrations for explaining an example of a watermarked document image. FIG. 11 is an enlarged view enlarging in part FIG. 10. The pattern shown in FIG. 7 (1) is used for explanation in this place. The watermarked document image is outputted from the output device 14.

The operation of the watermark embedment device 10 has been mentioned in the above. In the next, the operation of the watermark information detection device 30 will be described with reference to FIG. 1 as well as FIGS. 14 through 20.

(Watermark Detection Portion 32)

Figure 12:
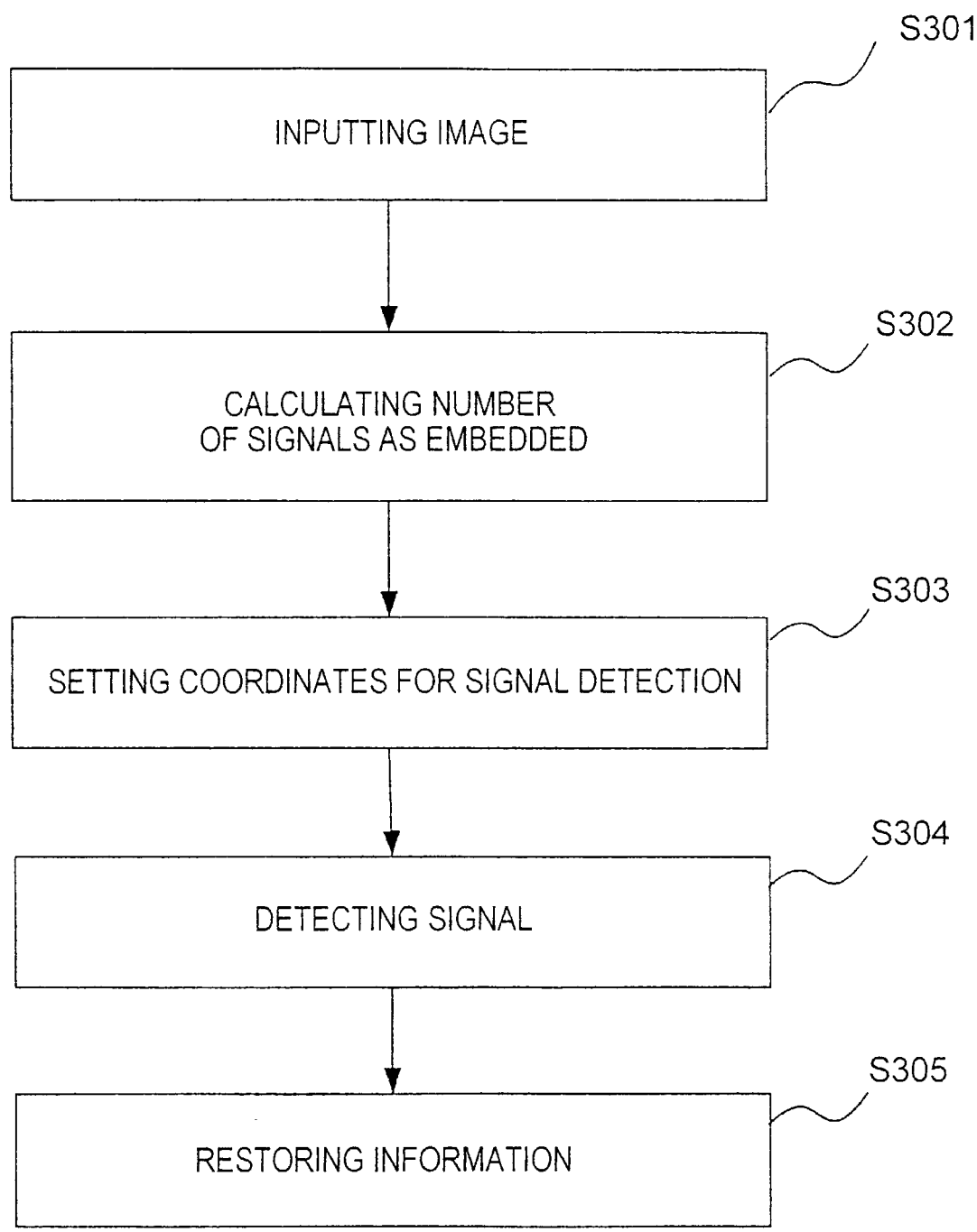
FIG. 12 is a flow chart indicating the flow of the processing of a watermark detection portion 32, FIG. 13 indicates illustrations wherein (1) shows an example of an input image while (2) shows an example of the input image after setting the boundary position of each unit pattern.

FIG. 12 is a flow chart indicating the flow of the processing of a watermark detection portion 32.

To begin with, a watermarked document image is inputted to the memory or the like of a computer with the help of such a device as a scanner (step S301). This image is called an input image. The input image is a multi-valued image and will be explained as a gray image of 256 intensity levels in the following. However, there is no need for the intensity level of the gray image to be limited to the intensity level of 256. It may be the intensity level of 16, for instance. The resolution of the input image (resolution at the time of fetching the image by the input device 31) may be allowed to be a little different from the resolution of the watermarked document image formed by the above watermark information embedment device 10. However, the following explanation will be made presuming that both of the resolutions as mention above are equal to each other. It is also presumed that the input image is amended by rotation, expansion, compression and so forth.

In the next, the number of unit patterns as embedded is calculated from the size of the input image and the size of the signal unit (step S302). For instance, if the size of the input pattern is W (width)×H (height), the size of the signal unit is Sw×Sh, and the unit pattern is made up of units of Uw×Uh, the number (N=Pw×Ph) of the unit patterns as embedded in the input image can be calculated by the following expression. That is:

$$Pw = \frac{W}{Sw \times Uw}, Ph = \frac{H}{Sh \times Uh}$$

However, if both resolutions of the watermark information embedment device 10 and the watermark information detection device 30 are different from each other, the above calculation has to be carried out after normalizing the size of the signal unit in the input image by the ratio of those resolutions.

Figure 13:
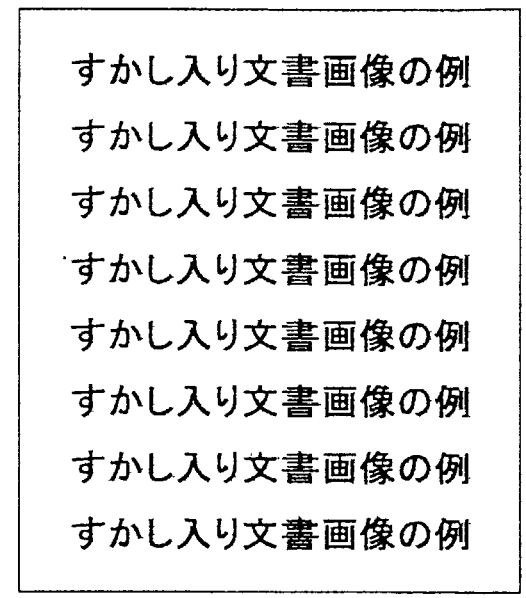
Figure 13:
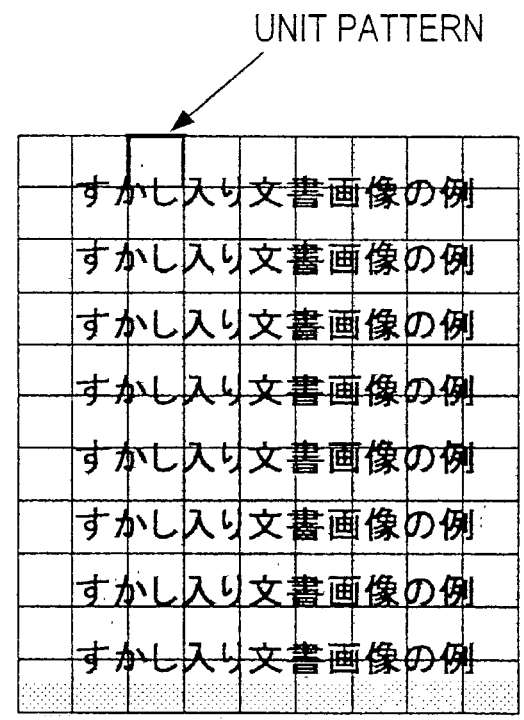

Next, the boundary position of each unit pattern in the input image is set based on the number of unit patterns as calculated in the step S302 (step S303). FIG. 13 indicates illustrations wherein FIG. 13 (1) shows an example of an input image while FIG. 13 (2) shows an example of the input image after setting the boundary position of each unit pattern.

Furthermore, signal detection of the symbol unit is executed with respect to every unit pattern defined by the boundary thereof, thereby restoring the unit pattern matrix (step S304). The signal detection will be described in detail in the following.

Figure 14:
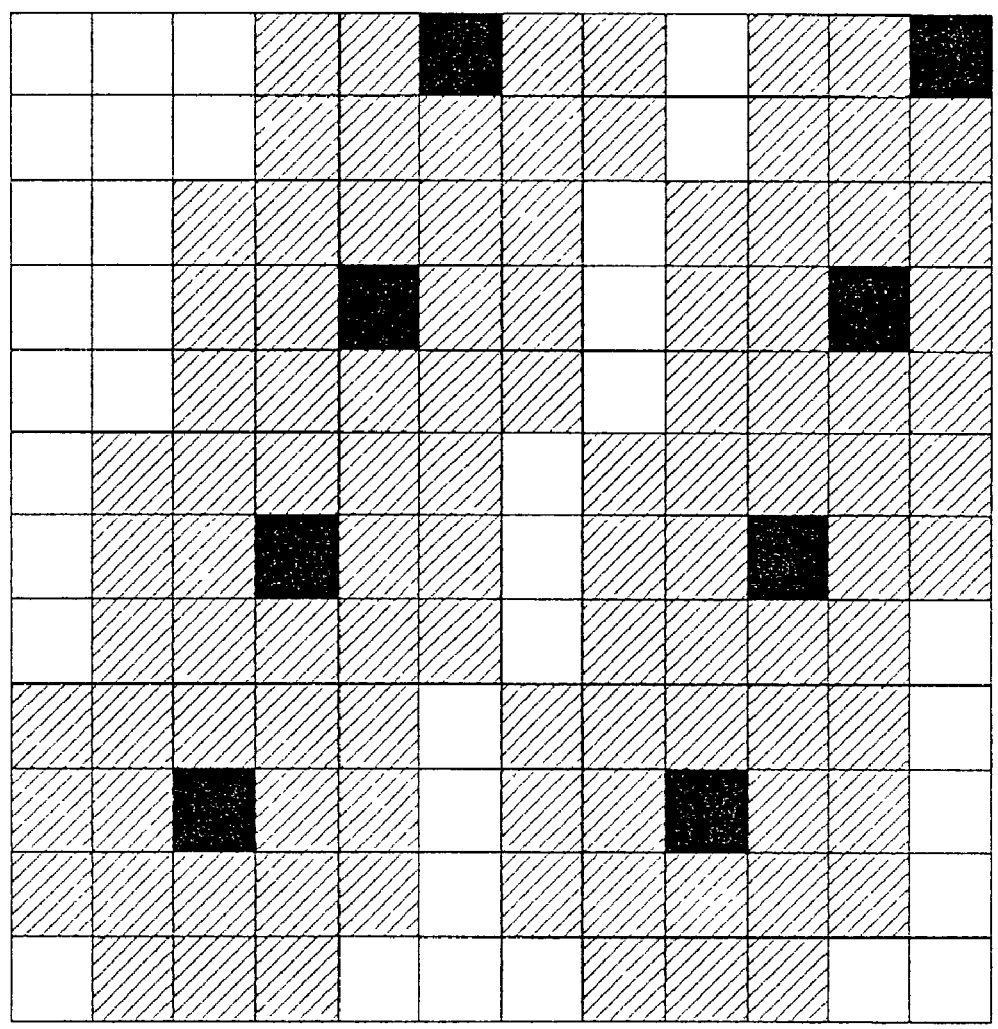
FIG. 14 shows an example of a region of the input image, which corresponds to the unit A.
Figure 15:
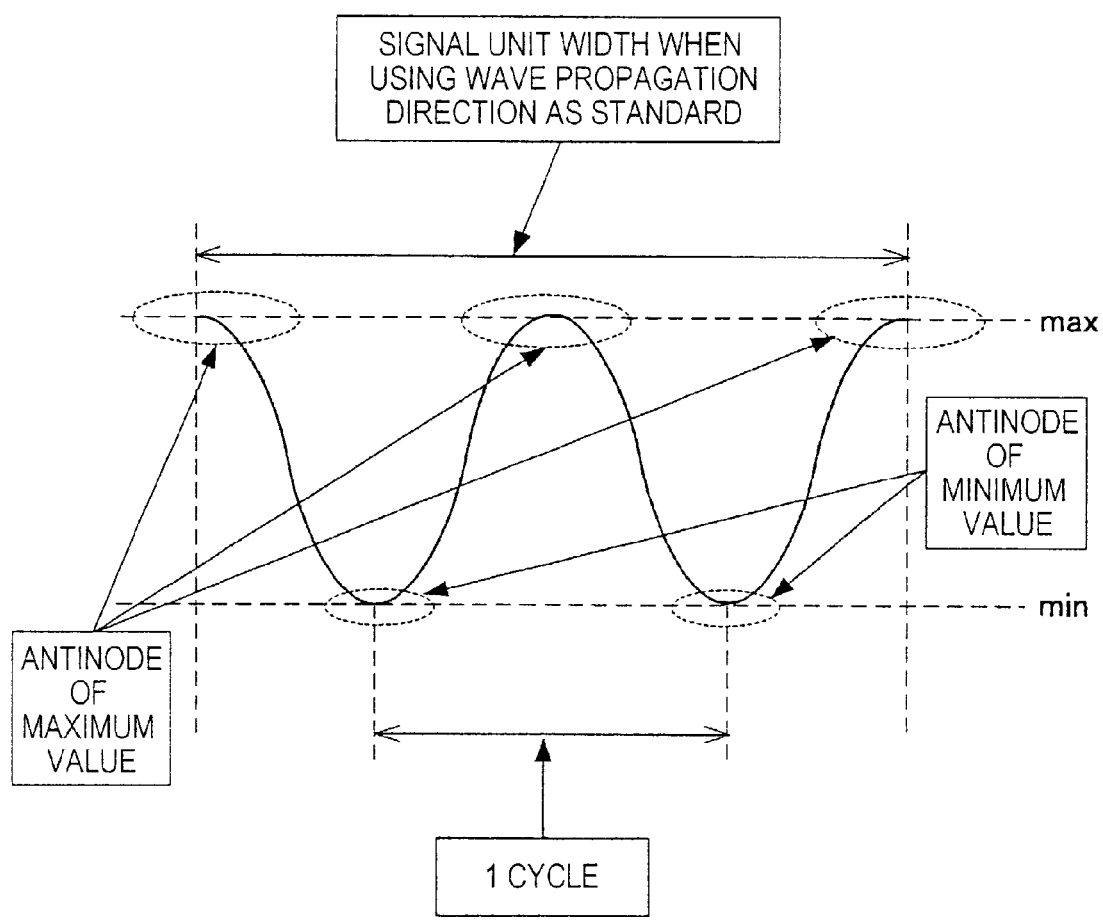
FIG. 15 is a sectional view attained when seeing in the direction in parallel with the wave propagation direction.

FIG. 14 shows an example of a region of the input image, which corresponds to the unit A as shown in FIG. 3 (1). In FIG. 3, the signal unit is the binary image while the signal unit is multi-valued image here. In case of printing the binary image, the circumferential area of the dot comes to have a gradating intermediate color made up of white and black as shown in FIG. 14. This is caused by an ink running in the printing paper, the quality of the printing paper and so forth. Accordingly, if seeing the region corresponding to the unit A in the input image in the direction in parallel with the wave propagation direction, the cross sectional view of FIG. 14 is expressed in the form as shown in FIG. 15. FIG. 4 is expressed in the form of a rectangular wave while FIG. 15 is expressed in the form of a smoother wave.

Actually, it would not be denied that the input image includes various noise components which would be caused by the local unevenness in the printing paper thickness, dirtied surface of the printed document, instability of the output and the image input device, and so forth. The following explanation will be made about the case where any noise component is not involved for easy understanding of the invention. However, as a matter of course, the method for signal detection according to the invention makes it possible to execute the stable signal detection even if such noise components are involved in the input image.

In the invention, a 2-dimensional wavelet filter is used for detecting the signal unit from an input image. This filter is able to define the wave frequency and propagation direction as well as the range of influence at the same time. In the following, there will be explained an example making use of a Gabor filter which is one of the 2-dimension wavelet filters. However, the 2-dimensional wavelet filter is not always limited to the Gabor filter; any wavelet filter is usable if it shows the same performance as the Gabor filters. Furthermore, it is possible to prepare and define a template and to use a method for carrying out the pattern matching.

The Gabor filter G(x, y) can be expressed by the following expression where x=0 through gw-1, y=0 through gh-1, and gw and gh indicating the size of the filter which is the same as that of the signal unit embedded by the watermark information embedment device 10.

$$G(x, y) = \exp\left[-\pi\left\{\frac{(x-x0)^2}{A^2} + \frac{(y-y0)^2}{B^2}\right\}\right] \times \exp[-2\pi i\{u(x-x0) + v(y-y0)\}]$$

where
I: imaginary
x=0 through gw-1, y=0 through gh-1, x0=gw/2, y0=gh/2
A: range of influence in the horizontal direction
B: range of influence in the vertical direction
$\tan^{-1}(\mu/\nu)$: wave propagation direction
$\sqrt{(\mu^2+\nu^2)}$ frequency For signal detection, there are prepared the Gabor filter of which the frequency, the wave propagation direction and the size are equal to those of the symbol unit as embedded in the input image. The number of the Gabor filters to be prepared is made equal to the number of the sorts of embedded signal units. In this explanation, the Gabor filters corresponding to the units A and B as shown in FIG. 3 are called the filters A and B, respectively.

The output value of the filter at an arbitrary position in the input image is calculated based on the convolution between the filter and the image. In case of the Gabor filter, there exist the real number filter and the imaginary number filter of which the phase is delayed from the former by a half wave length, so that the mean square of the output of these filters is defined and used as the whole output value of them. For instance, if respective convolutions between the image and filters A and B are Rc and Ic, the whole output value F(A) is indicated by the following expression.

$$F(A) = \sqrt{Rc^2 + Ic^2}$$

Figure 16:
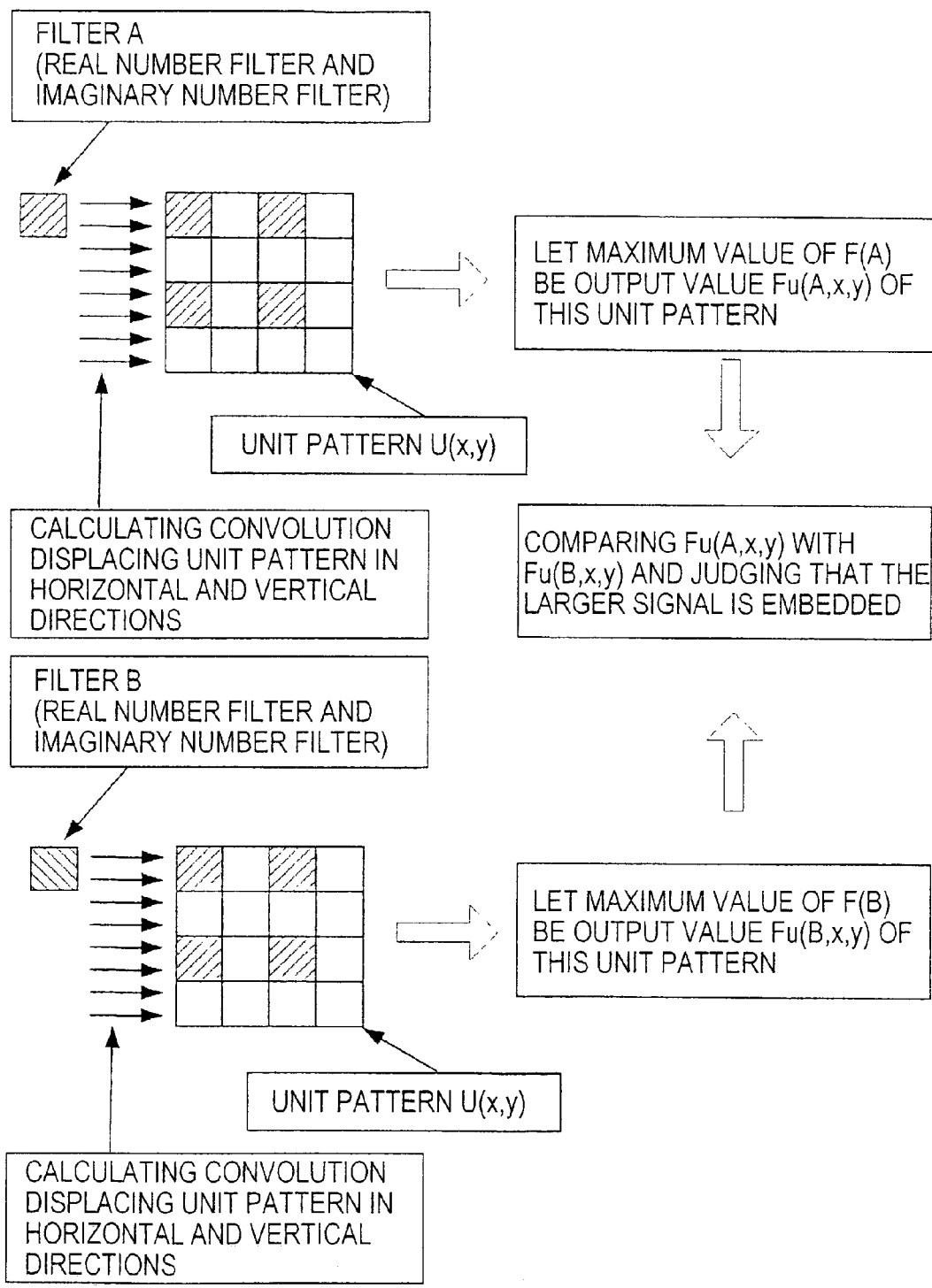
FIG. 16 indicates illustrations for explaining a method for judging whether a symbol unit embedded in a unit pattern U (x, y) is the unit A or the unit B.

FIG. 16 indicates illustrations for explaining a method for judging whether a symbol unit embedded in the unit pattern U (x, y) as sectioned in the step S303 is the unit A or the unit B.

The steps of judging the symbol to the unit pattern U(x, y) is carried out as follows.

(1) Calculating F(A) with respect to every position in the unit pattern U(x, y) while moving the position of the filter A, and let the maximum value among the calculation results be the output value of the filter A to the unit pattern U(x, y), and let this output be Fu(A, x, y).

(2) Calculating the output value of the filter B to the unit pattern U(x, y) in the same way as has been done in the above (1), and let this output be Fu(B, x, y).

(3) Comparing Fu(A, x, y) with Fu(B, x, y). If Fu(A, x, y)≧Fu(B, x, y), it is judged that the symbol unit embedded in the unit pattern U(x, y) is the unit A, and if Fu(A, x, y)<Fu(B, x, y), it is judged that the symbol unit embedded in the unit pattern U(x, y) is the unit B.

In the above (1) and (2), the step width for moving the filter may be set arbitrarily, and the calculation may be carried in respect to only output values at representative positions. Furthermore, if the absolute value of the difference between Fu(A, x, y) and Fu(B, x, y) is less than a predetermined threshold value, it may be decided that the judgment is impossible.

Still further, in the above (1), if the maximum value of F(A) exceeds a predetermined threshold value in the process of calculating the convolution while moving the filter, it is possible to immediately stop the signal detection processing with the judgment that the symbol unit embedded in U(x, y) is unit A. Similar to this, in the above (2), if the maximum value of F(B) exceeds a predetermined threshold value in the process of calculating the convolution while moving the filter, it is possible to immediately stop the signal detection processing with the judgment that the symbol unit embedded in U(x, y) is unit A.

The signal detection (step S304) has been explained in detail as mentioned above. Now, we go back to the flow chart shown in FIG. 12 again to explain the step S305. In this step S305, the symbols of the unit pattern matrix are combined with each other, thereby reconstituting the data code to restore the original information.

Figure 17:
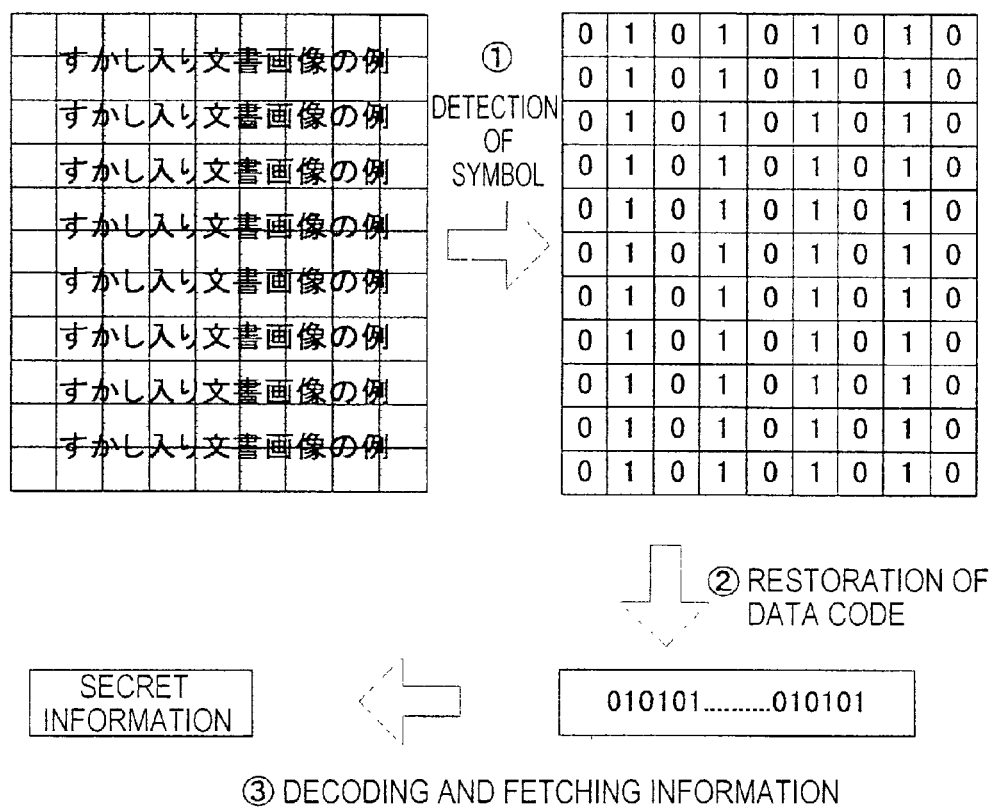
FIG. 17 shows illustrations for explaining an example of information restoration.

FIG. 17 shows illustrations for explaining an example of information restoration. The steps of information restoration are as follows.

(1) Detecting the symbol embedded in each unit pattern (FIG. 17①).
(2) Connecting symbols to restore the data code (FIG. 17②).
(3) Restoring the data code to fetching the information as embedded (FIG. 17③).

Figure 18:
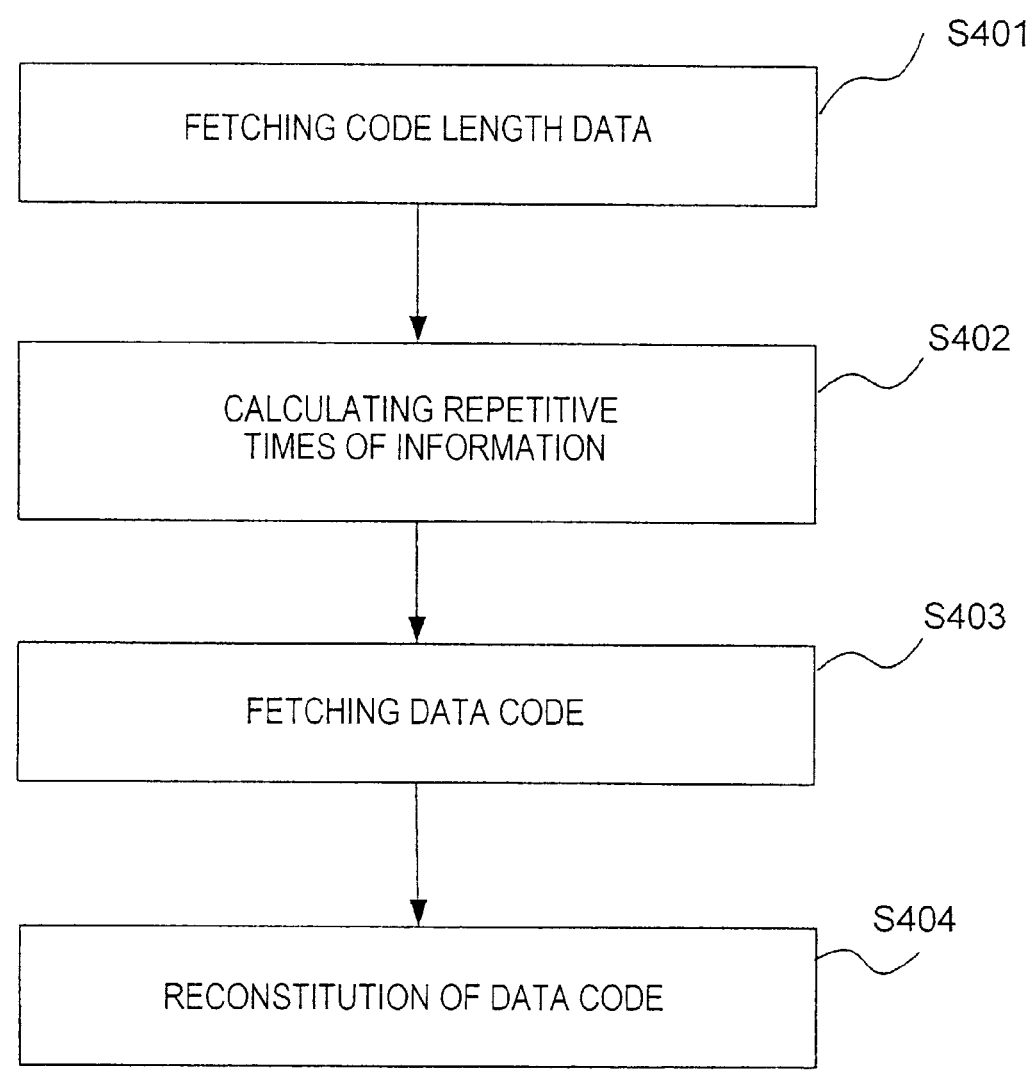
FIG. 18 is a flow chart showing a method for restoring data code.
Figure 19:
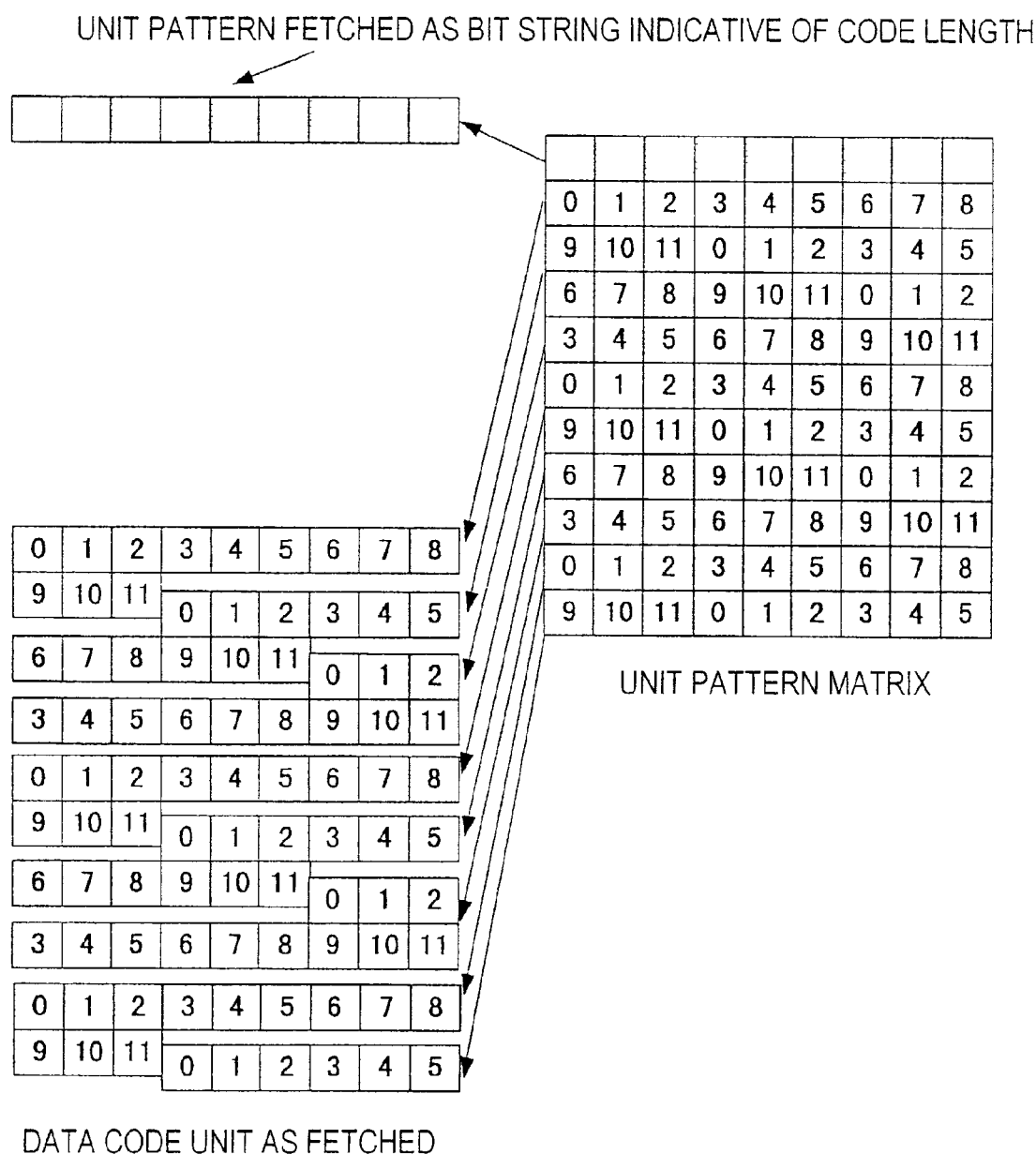
FIGS. 19 and 20 show an example of a method for restoring data code.
Figure 20:
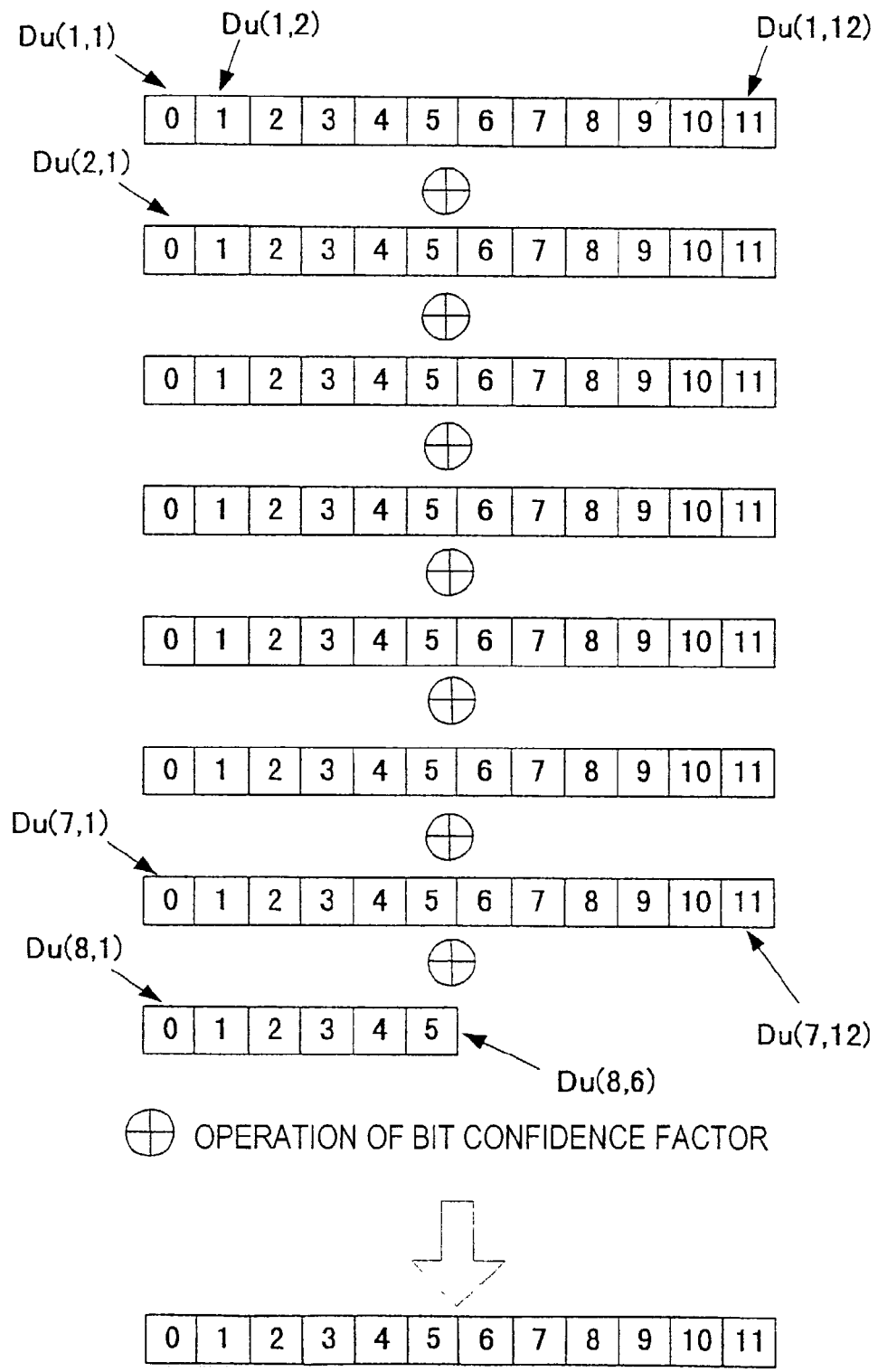

FIG. 18 is a flow chart showing a method for restoring data code, and FIGS. 19 and 20 show an example of a method for restoring data code. As will be seen from the above flow chart, the restoration method is basically carried out along the reverse steps of method for embedding the information shown in FIG. 8.

Referring to FIG. 18, the code length data portion is first taken out from the first row of the unit pattern matrix, thereby obtaining the code length of the data codes as embedded there (step S401).

Then, the number of times Dn of having embedded the data code unit and the surplus are calculated based on the size of the unit pattern matrix and the code length of the data codes obtained in the step of S401 as well (step S402).

Then, the data codes are fetched from the second row and thereafter of the unit pattern matrix by carrying out the method as performed in the step of S203 in reverse order (step S403). In the example shown in FIG. 19, every set of 12 pattern units (data code units) of the unit pattern matrix is taken out in sequence starting from U(1, 2) (2nd row, 1st column), that is U(1, 2)~U(3, 3), U(4, 3)~U(6, 4) . . . . This shows Dn=7 and Rn=6, in other words, the pattern units (data code unit) of 12 is taken out seven times while the pattern units of 6 (corresponding to the MSB's of 6 of the data code unit), that is U(4, 11)~U(9, 11) are taken out additionally, Next, the operation of bit confidence factor is executed with regard to the data code unit as taken out in the step S403, thereby reconstituting the embedded data codes (step S404). The operation of bit confidence factor will be explained in the following.

Now, as shown in FIG. 20, let us write the data code unit first taken out from the second row and the first column of the unit pattern matrix to be Du(1, 1)~Du(12, 1) and in the same way, let us write in sequence the next one and thereafter to be Du(1, 2)~Du(12, 2) . . . . Then, the surplus portion is written to be Du(1, 8)~Du(6, 8). The operation of bit confidence factor is to decide the value of each symbol of the data codes with regard to the element of each data code unit based on the principle of the majority decision or the like. Accordingly, even if a correct signal can not be detected from an arbitrary unit in an arbitrary code data unit (bit reversed error etc.) due to the document images overlapped with each other, stains as put on the printing paper or the like, the data code can be correctly restored finally.

To put it more concretely, for instance, if the signal detection result of Du(1, 1), Du(1, 2), . . . , Du(1, 8) shows that "1" is a majority, the first bits of the data codes is judged to be "1," while if "0" is a majority, it is judged to be "0." In the same manner, the second bit of the data codes is judged by applying to the majority principle to the signal detection result of Du(2, 1), Du(2, 2), . . . , Du(2, 8), and the 12th bit of the data codes is judged by applying to the majority principle to the signal detection result of Du(12, 1), Du(12, 2), . . . , Du(12, 7) (Du(12,8) does not exist).

The operation of bit confidence factor can be executed by adding the output value of the signal detection filter as shown in FIG. 16. For instance, assuming that the symbol "0" is assigned to the unit A of FIG. 3 (1) and the symbol "1" is assigned to the unit B of FIG. 3 (2), let the maximum value of the output from the filter A to Du(m, n) be Df(A, m, n) and let the maximum value of the output from the filter B to Du(m, n) be Df(B, m, n), the Mth bit of the data codes is judged to be "1" if the following condition is satisfied.

$$\sum_{n=1}^{Dn} Df(A, M, n) \geq \sum_{n=1}^{Dn} Df(B, M, n)$$

If not satisfied, however, the Mth bit is judged to be "0." However, if N<Rn, the addition number of times comes to be up to n=1 through Rn+1.

So far, the explanation has been made about the case where the data code is repetitively embedded. However, if using the error correction code or the like when coding the data, it is possible to realize a method which would not need repetition of the data code unit. Furthermore, if using the error correction code or the like when coding the data and repetitively executing embedment thereof, it would become possible to realize a secure method.

As described in detail in the above, according to the embodiment of the invention, the following excellent effects become obtainable.

(1) As the embedded information is expressed by mean so difference in the dot arrangement, there is no need for the font, the space between characters, and the line pitch of the document to be changed.

(2) As the density (the number of dots in a constant section) of the dot pattern to which the symbol is assigned is made equal to that of the dot pattern to which no symbol is assigned, the background of the document looks like a half-tone dot meshing of uniform density to the eye, thus existence of the information becoming inconspicuous.

(3) As far as the dot pattern to which the symbol is assigned and the dot pattern to which no symbol is assigned are kept secret to third parties, it would be hardly possible for third parties to break the embedded information.

(4) As the pattern indicating the information is a set made up of very tiny dots and is embedded in the document to be the background covering the entire back surface of it, so that even if the algorithm regarding embedment is made open, it would be so hard, rather impossible to alter the information embedded in the printed document.

(5) The detection of the embedded information is executed by focusing to the difference in the propagation direction of the wave (change in light and shade of color), not by focusing to each of individual pixels, so that the stable information detection can be carried out even if the printed document is stained to a certain extent.

(6) The same information is repeatedly embedded and all the embedded information is utilized at the time of detection, for restoring the information. Therefore, it becomes possible to stably fetch the embedded information, even if there happens a partial omission of the information which is caused by a certain large font character covering in part the signal portion, stains as put on the printing paper, and so forth.

The watermark information embedment device and the watermark information detection device according to the invention have been discussed so far by way of an exemplary example and with reference to the accompanying drawings, but the invention should not be limited to this example. It is apparent that one who is skilled in the art may make various variation or modification of the invention within the category of the technical thoughts as recited in the scope of claims for patent attached hereto. It is understood that such variation or modification naturally belongs to the technical scope of the invention.

What is claimed is:

1. A watermark information embedment device comprising:
   a document image formation portion forming a document image based on document data on a page by page basis;
   a watermark image formation portion forming a watermark image; and
   a watermarked document image composition portion forming a watermarked document image by putting said document image on said watermark image;
   wherein said watermark image is made up of a plurality of different sorts of dot patterns regularly arranged according to a certain rule, and at least one sort of said dot patterns is provided with secret information indicative of a specific confidential matter,
   wherein the dot patterns of each sort have a dot arrangement that provides a wave propagation direction and a wavelength, at least one of said wave propagation direction and said wavelength being different from each of the sorts,
   wherein each dot pattern of the same sort is given the same symbol, and
   wherein said secret is represented by combining said dot patterns.

2. A watermark information embedment device as claimed in claim 1, wherein said symbol is made up of an effective symbol portion forming in part said secret information and an ineffective symbol portion having nothing to do with said secret information.

3. A watermark information embedment device comprising:
   a document image formation portion forming a document image based on document data on a page by page basis;

a watermark image formation portion forming a watermark image; and a watermarked document image composition portion forming a watermarked document image by putting said document image on said watermark image;

wherein said watermark image is made up of a plurality of different sorts of dot patterns regularly arranged according to a certain rule, and at least one sort of said dot patterns is provided with secret information indicative of a specific confidential matter, wherein the dot patterns of each sort have a wave propagation direction and a wave length, at least one of said wave propagation direction and said wavelength being different for each of said sorts, wherein one combination of at least two sorts of said dot patterns is given one symbol, and wherein said secret information is represented by further combining combinations of said dot patterns with another one.

4. A watermark information embedment device as claimed in claim 1 further comprising an output device for outputting said watermarked document image on a printing paper, wherein said secret information is repetitively embedded within an arbitrary region of the printing paper which is outputted by said output device.

5. A watermark information embedment device as claimed in claim 1 further comprising an output device for outputting said watermarked document image on a printing paper, wherein said secret information is repetitively embedded in a part or on the entire surface of the printing paper which is outputted by said output device.

6. A watermark information detection device comprising:

a watermark detection portion for detecting a watermark image from a watermarked document image formed by putting a document image on a watermark image in which a plurality of sorts of dot patterns are embedded, wherein said watermark detection portion is provided with at least one filter for extracting the same plural sorts of dot patterns as said watermark image, and said watermark image is extracted by examining the matching between said at least one filter and said watermarked document image, wherein the dot patterns of each sort have a wave propagation direction and a wavelength, at least one of said wave propagation direction and said wavelength being different for each of the sorts, wherein each dot pattern of the same sort is given the same symbol, wherein said secret information is represented by combining said dot patterns, and wherein said at least one filter comprises a plurality of 2-dimensional wavelet filters of which the number is equal to the number of sorts of dot patterns.

7. A watermark information detection device as claimed in claim 6 further comprising:

an input device for reading out a watermarked document image printed on a printing paper, wherein said watermark detection portion performs a matching examination over the watermarked document image as read out by the said input device, thereby extracting said watermark image therefrom.

8. A watermark information detection device as claimed in claim 6, wherein there is calculated convolution between an arbitrary region in said watermarked image and a plurality of said 2-dimensional wavelet filters, and it is judged that one of said dot patterns embedded in said region corresponds to one of said 2-dimensional wavelet filters according to which convolution a has maximum value.

9. A watermark information detection device as claimed in claim 6, wherein there is calculated convolution between an arbitrary region in said watermarked image and an arbitrary one of the 2-dimensional wavelet filters, and it is judged that one of said dot patterns embedded in said region corresponds to said arbitrary 2-dimensional wavelet filter if the calculated convolution exceeds a certain threshold value.

10. A watermark information detection device as claimed in claim 6, wherein said secret information is repetitively embedded in a certain arbitrary region or the entire region of the printing paper to be inputted to said input device, and there are computed convolutions between said arbitrary region or the entire region in said watermarked image and a plurality of said 2-dimensional wavelet filters to attain a sum of calculated convolution values, and it judged that one of said dot patterns embedded in said region corresponds to one of said 2-dimensional wavelet filters by which said sum becomes maximum.

11. A watermark information detection device as claimed in claim 7, wherein said 2-dimensional wavelet filter is a Gabor filter.

* * * * *